(12) United States Patent
Liang et al.

(10) Patent No.: US 9,538,357 B2
(45) Date of Patent: Jan. 3, 2017

(54) METHOD AND APPARATUS FOR PROCESSING D2D DEVICE IDENTITY

(71) Applicant: ZTE Corporation, Shenzhen (CN)

(72) Inventors: Feng Liang, Shenzhen (CN); Shuanshuan Wu, Shenzhen (CN); Haitao Ren, Shenzhen (CN); Lu Gan, Shenzhen (CN); Shuang Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/425,089

(22) PCT Filed: Aug. 23, 2013

(86) PCT No.: PCT/CN2013/082232
§ 371 (c)(1),
(2) Date: Jul. 8, 2015

(87) PCT Pub. No.: WO2014/032552
PCT Pub. Date: Mar. 6, 2014

(65) Prior Publication Data
US 2015/0341772 A1 Nov. 26, 2015

(30) Foreign Application Priority Data

Aug. 31, 2012 (CN) .......................... 2012 1 0319786

(51) Int. Cl.
*H04W 8/00* (2009.01)
*H04W 48/10* (2009.01)
(Continued)

(52) U.S. Cl.
CPC ............. *H04W 8/005* (2013.01); *H04W 48/10* (2013.01); *H04W 76/023* (2013.01); *H04W 48/14* (2013.01)

(58) Field of Classification Search
CPC .. H04W 8/005; H04W 76/023; H04W 76/021; H04W 12/06; H04W 48/10; H04L 63/08; H04L 63/065; H04L 9/083; H04L 9/0847
(Continued)

(56) References Cited

U.S. PATENT DOCUMENTS

2015/0071189 A1* 3/2015 Park .................... H04W 76/023
370/329
2015/0327046 A1* 11/2015 Lee ..................... H04W 56/002
370/338

FOREIGN PATENT DOCUMENTS

| CN | 1571529 A | 1/2005 |
| CN | 101785331 A | 7/2010 |

(Continued)

OTHER PUBLICATIONS

International Search Report for corresponding application PCT/CN2013/082232 filed Aug. 23, 2013; Mail date Nov. 28, 2013.

*Primary Examiner* — Phuoc H Doan
(74) *Attorney, Agent, or Firm* — Cantor Colburn LLP

(57) ABSTRACT

The disclosure provides a method and an apparatus for processing Device-to-Device (D2D) device identity. The method includes that: a D2D device transmits a temporary D2D identity request; the D2D device receives temporary D2D identity authorization information corresponding to the temporary D2D identity request, and acquires a temporary D2D identity; and the D2D device broadcasts the received temporary D2D identity, wherein the temporary D2D identity is configured to discover the D2D device by a discovering D2D device in a D2D discovery process. By the disclosure, the security of communication among the D2D devices is improved.

18 Claims, 13 Drawing Sheets

(51) Int. Cl.
*H04W 76/02* (2009.01)
*H04W 48/14* (2009.01)

(58) Field of Classification Search
USPC .................. 455/459; 370/329, 338; 709/223
See application file for complete search history.

(56) References Cited

FOREIGN PATENT DOCUMENTS

| | | |
|---|---|---|
| CN | 102014376 A | 4/2011 |
| WO | 2012114161 A1 | 8/2012 |

* cited by examiner

US 9,538,357 B2

METHOD AND APPARATUS FOR PROCESSING D2D DEVICE IDENTITY

TECHNICAL FIELD

The embodiments of the disclosure relate to the communication field, in particular to a method and an apparatus for processing Device-to-Device (D2D) device identity.

BACKGROUND

Cellular-based D2D communication is a novel technology for direct communication among multiple terminal devices which support D2D function under the control of a system. By virtue of the cellular-network-based D2D communication, system resource occupation can be reduced, the spectral efficiency of a cellular communication system can be improved, the transmission power consumption of a terminal can be lowered, and network operation expense can be lowered greatly. FIG. 1 is a diagram of a cellular-based D2D communication mode in a related art, and as shown in FIG. 1, data is transmitted between a D2D device 1 and a D2D device 2.

The D2D device needs a process to discover other adjacent D2D device(s) before performing D2D transmission. The discovery of the D2D device refers to that: the existence of a D2D device can be discovered by one or more other D2D device(s), and a characteristic such as an identity of the D2D device can be identified.

A method for discovering the D2D device in the related art is implemented as follows: the discovered D2D device broadcasts its own identity information, and one or more discovering D2D devices search for the corresponding D2D device identity information, and identify the found D2D device identity information, thereby finishing the discovery process of the D2D device.

In the discovery process of the D2D device, in order to conveniently mark and identify the identity information of the discovered device and ensure that the identity privacy of the discovered device will not be exposed, a method of encrypting the identity information of the discovered device and setting that an encryption key can be acquired by discovering device(s) selected by the discovered device only is adopted in the related art, then only the selected discovering device(s) which has known the key can identify the identity information of the discovered device when the discovered device broadcasts its encrypted identity information, and other discovering device(s) cannot acquire the privacy of the discovered device.

For the problem of higher security risk of a communication process in an identity processing process of the D2D device in the related art, there is yet no effective solution.

SUMMARY

For the problem of higher security risk of a communication process in an identity processing process of a D2D device in the related art, the embodiments of the disclosure provide a method and an apparatus for processing the D2D device identity, so as to at least solve the problem.

According to one embodiment of the disclosure, a method for processing Device-to-Device (D2D) device identity is provided, which includes that: a D2D device transmits a temporary D2D identity request; the D2D device receives temporary D2D identity authorization information corresponding to the temporary D2D identity request, and acquires a temporary D2D identity; and the D2D device broadcasts the acquired temporary D2D identity, wherein the temporary D2D identity is used for discovering the D2D device by a discovering D2D device in a D2D discovery process.

In the described embodiment, after the D2D device transmits a temporary D2D identity request, the method further comprises: the D2D device receives temporary D2D identity authorization denial information corresponding to the temporary D2D identity request; and the D2D device ends an identity marking and identification process in the D2D discovery process.

In the described embodiment, the temporary D2D identity is used for identifying, within a preset time and a preset area coverage, a temporary identity of the D2D device and/or a temporary identity of a user corresponding to the D2D device.

According to another embodiment of the disclosure, a method for processing Device-to-Device (D2D) device identity is provided, which includes that: a D2D device acquires one or more temporary identities; the D2D device transmits a temporary D2D identity report, wherein the one or more temporary identities or one or more indexes of the one or more D2D temporary identities are carried in the temporary D2D identity report; and the D2D device receives D2D identification success information corresponding to the temporary identity report, and the D2D device acquires a long-term D2D identity and/or D2D application layer identity carried in the D2D identification success information.

In the described embodiment, after the D2D device transmits the temporary D2D identity report, the method further includes that: the D2D device receives D2D identification failure information corresponding to the temporary identity report; and the D2D device ends an identity marking and identification process in a D2D discovery process.

In the described embodiment, the step that the D2D device acquires the one or more D2D temporary identities includes that: the D2D device performs preset-class-based filtration according to at least one piece of the following information of one or more discovered D2D devices: a type of the discovered D2D device, a purpose and type of a temporary D2D identity request transmitted by the discovered D2D device and a type of a service provided by the discovered D2D device; and the D2D device employs one or more D2D temporary identities obtained by filtration as the acquired one or more temporary identities.

In the described embodiment, the temporary D2D identity is used for identifying, within a preset time and a preset area coverage, a temporary identity of the D2D device and/or a temporary identity of a user corresponding to the D2D device; the long-term D2D identity is used for carrying long-term identity information of the D2D device and/or the user corresponding to the D2D device; and the D2D application layer identity is used for identifying the application layer identity information of the D2D device and/or the user corresponding to the D2D device in different applications, wherein the D2D device has one or more D2D application layer identities.

In the described embodiment, the long-term D2D identity includes one or a combination of: a Temporary Mobile Subscriber Identity (TMSI), a Globally Unique Temporary UE Identity (GUTI), an International Mobile Subscriber Identity (IMSI), an International Mobile Equipment Identity (IMEI), an Internet Protocol (IP) address and D2D device dedicated identity information.

According to one embodiment of the disclosure, a method for processing Device-to-Device (D2D) device identity is provided, which includes that: a D2D discovery system receives a temporary D2D identity request; the D2D discovery system determines whether to accept the temporary D2D identity request according to a preset strategy; and when the D2D discovery system determines to accept the temporary D2D identity request, transmitting, the D2D discovery system transmits temporary identity authorization information corresponding to the temporary D2D identity request, establishes or updates a first mapping relationship between a temporary D2D identity and a long-term D2D identity of a D2D device, and/or establishes or updates a second mapping relationship between the temporary D2D identity and a D2D application layer identity of the D2D device.

In the described embodiment, the step that the D2D discovery system determines whether to accept the temporary D2D identity request according to the preset strategy includes that: the D2D discovery system determines whether the temporary D2D identity request is allowed to be accepted according to a preset network strategy and a current network condition; the D2D discovery system performs legality authentication on the D2D device; and the D2D discovery system determines to accept the temporary D2D identity request when the temporary D2D identity request is allowed to be accepted and the D2D device is authenticated to be legal, otherwise determines not to accept the temporary D2D identity request.

In the described embodiment, the preset network strategy includes: a supporting strategy of a current network over a D2D discovery function; or the supporting strategy of the current network over the D2D discovery function and at least one of: a type of the discovered D2D device, a purpose and type of the temporary D2D identity request transmitted by the discovered D2D device and a type of a service provided by the discovered D2D device; and the current network condition includes at least one of:

a load condition, a radio resource occupation condition and a core network resource occupation condition.

In the described embodiment, the step that the D2D discovery system performs legality authentication on the D2D device includes that: the D2D discovery system acquires the long-term D2D identity and/or D2D application layer identity of the D2D device; and the D2D discovery system authenticates the long-term D2D identity and/or the D2D application layer identity.

In the described embodiment, the temporary D2D identity is used for identifying, within a preset time and a preset area coverage, a temporary identity of the D2D device and/or a temporary identity of a user corresponding to the D2D device; the long-term D2D identity is used for bearing long-term identity information of the D2D device and/or the user corresponding to the D2D device; and the D2D application layer identity is used for identifying the application layer identity information of the D2D device and/or the user corresponding to the D2D device in different applications, wherein the D2D device has one or more D2D application layer identities.

In the described embodiment, the long-term D2D identity includes one or a combination of: a TMSI, a GUTI, an IMSI, an IMEI, an IP address and D2D device dedicated identity information.

In the described embodiment, the temporary identity authorization includes: the temporary D2D identity or an index of the temporary D2D identity.

In the described embodiment, the D2D discovery system includes: a network side management entity; or the network side management entity and an application layer management entity.

In the described embodiment, the network side management entity includes at least one of: an evolved Node B (eNB), a Mobile Management Entity (MME), a Home Subscriber Server (HSS) and a D2D network side dedicated management entity; and the application layer management entity includes at least one of: an Application Server (AS) and a D2D application layer dedicated server.

According to one embodiment of the disclosure, a method for processing Device-to-Device (D2D) device identity is provided, which includes that: a D2D discovery system receives a temporary D2D identity report, wherein one or more temporary D2D identities or one or more indexes of the one or more D2D temporary identities are carried in the temporary D2D identity report; the D2D discovery system determines whether identity information of a second D2D device marked by the temporary D2D identity is successfully identified according to at least one of:

the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device; and when the identity information of second D2D device marked by the temporary D2D identity is successfully identified, the D2D discovery system transmits D2D identification success information corresponding to the temporary D2D identity report.

In the described embodiment, when the identity information of second D2D device marked by the temporary D2D identity is not identified, the method further includes that: the D2D discovery system transmits D2D identification failure information corresponding to the temporary D2D identity report.

In the described embodiment, the step that the D2D discovery system determines whether the identity information of second D2D device marked by the temporary D2D identity is successfully identified includes that: the D2D discovery system determines whether to allow identification over the second D2D device according to a preset network strategy and a current network condition; the D2D discovery system performs legality authentication on first D2D device transmitting the temporary D2D identity report and the second D2D device; and the D2D discovery system determines that the identification over the second D2D device succeeds when the identification over the second D2D device is allowed and authentication results of the D2D discovery system over the first D2D device and the second D2D device are positive; when the identification over the second D2D device is not allowed and authentication results of the D2D discovery system over the first D2D device and the second D2D device are negative, the identification over the second D2D device fails.

In the described embodiment, the preset network strategy includes: a supporting strategy of a current network over a D2D discovery function; or the supporting strategy of the current network over the D2D discovery function and at least one of: a type of discovered D2D device, a purpose and type of the temporary D2D identity request transmitted by the discovered D2D device and a type of a service provided by the discovered D2D device.

The current network condition includes: a maintenance condition of a first mapping relationship between the temporary D2D identity and long-term D2D identity of the second D2D device marked by the temporary D2D identity in the D2D discovery system and/or a second mapping relationship between the temporary D2D identity and D2D application layer identity of the second D2D device; or the maintenance condition and at least one of: a load condition, a radio resource occupation condition and a core network resource occupation condition.

The step that the D2D discovery system performs legality authentication on the second D2D device includes that: the D2D discovery system acquires the long-term D2D identity and/or D2D application layer identity of the second D2D device, and authenticates the long-term D2D identity and/or D2D application layer identity of the second D2D device.

In the described embodiment, the step that the D2D discovery system performs legality authentication on the first D2D device and the second D2D device includes that: the D2D discovery system acquires a long-term D2D identity and/or D2D application layer identity of the first D2D device, a first filtering list and/or first filtering criterion of the first D2D device, corresponding to the long-term D2D identity of the first D2D device, and/or a second filtering list and/or second filtering criterion of the first D2D device, corresponding to the D2D application layer identity; the D2D discovery system acquires the long-term D2D identity and/or D2D application layer identity of the second D2D device, a third filtering list and/or third filtering criterion of the second D2D device, corresponding to the long-term D2D identity of the second D2D device, and/or a fourth filtering list and/or fourth filtering criterion of the second D2D device, corresponding to the D2D application layer identity of the second D2D device; the D2D discovery system authenticates the long-term D2D identity of the first D2D device and the long-term D2D identity of the second D2D device according to the following first information, wherein the first information includes: the long-term D2D identity of the first D2D device, the long-term D2D identity of the second D2D device, the first filtering list and/or the first filtering criterion, and the third filtering list and/or the third filtering criterion; and the D2D discovery system authenticates the D2D application layer identity of the first D2D device and the D2D application layer identity of the second D2D device according to second information, wherein the second information includes: the D2D application layer identity of the first D2D device, the D2D application layer identity of the second D2D device, the second filtering list and/or the second filtering criterion, and the fourth filtering list and/or the fourth filtering criterion.

In the described embodiment, the step that the D2D discovery system acquires the long-term D2D identity and/or D2D application layer identity of the second D2D device includes that: the D2D discovery system acquires the temporary D2D identity corresponding to the second D2D device; the D2D discovery system acquires the long-term D2D identity corresponding to the second D2D device according to the first mapping relationship between the temporary D2D identity and long-term D2D identity corresponding to the second D2D device; and/or the D2D discovery system acquires the D2D application layer identity corresponding to the second D2D device according to the second mapping relationship between the temporary D2D identity and D2D application layer identity corresponding to the second D2D device.

In the described embodiment, the first filtering list and/or the first filtering criterion include(s) at least one of: the long-term D2D identity of the second D2D device which is allowed or not allowed to be discovered by the first D2D device, and a set of D2D long-term identities of a group of second D2D device which is allowed or not allowed to be discovered by the first D2D device and has the same characteristic.

In the described embodiment, the second filtering list and/or the second filtering criterion include(s) at least one of: the D2D application layer identity of the second D2D device which is allowed or not allowed to be discovered by the first D2D device, and a set of D2D application layer identities of a group of second D2D device which is allowed or not allowed to be discovered by the first D2D device and has the same characteristic.

In the described embodiment, the third filtering list and/or the third filtering criterion include(s) at least one of: the long-term D2D identity of the first D2D device which is allowed or not allowed to be discovered by the second D2D device, and a set of D2D long-term identities of a group of first D2D device which is allowed or not allowed to be discovered by the second D2D device and has the same characteristic.

In the described embodiment, the fourth filtering list and/or the fourth filtering criterion include(s) at least one of: the D2D application layer identity of the first D2D device which is allowed or not allowed to be discovered by the second D2D device, and a set of D2D application layer identities of a group of first D2D device which is allowed or not allowed to be discovered by the second D2D device and has the same characteristic.

In the described embodiment, the D2D identification success information includes: an authenticated long-term D2D identity of the second D2D device marked in the temporary D2D identity report and/or an authenticated D2D application layer identity of the second D2D device marked in the temporary D2D identity report.

In the described embodiment, the temporary D2D identity is used for identifying, within a preset time and a preset area coverage, a temporary identity of the D2D device and/or a temporary identity of a user corresponding to the D2D device; the long-term D2D identity is used for bearing the long-term identity information of the D2D device and/or the user corresponding to the D2D device; and the D2D application layer identity is used for identifying the application layer identity information of the D2D device and/or the user corresponding to the D2D device in different applications, wherein the D2D device has one or more D2D application layer identities.

In the described embodiment, the long-term D2D identity includes one or a combination of: a TMSI, a GUTI, an IMSI, an IMEI, an IP address and D2D device dedicated identity information.

According to one embodiment of the disclosure, an apparatus for processing Device-to-Device (D2D) device identity is provided, which is applied to a D2D device and includes: a first transmission component, configured to transmit a temporary D2D identity request; a first receiving component, configured to receive temporary D2D identity authorization information corresponding to the temporary D2D identity request; a first acquisition component, configured to acquire a temporary D2D identity; and a broadcasting component, configured to broadcast the acquired temporary D2D identity, wherein the temporary D2D identity is configured to discover the D2D device by a discovering D2D device in a D2D discovery process.

In the described embodiment, the device further includes: a second receiving component, configured to receive temporary D2D identity authorization denial information corresponding to the temporary D2D identity request; and a first processing component, configured to end an identity marking and identification process in the D2D discovery process.

According to one embodiment of the disclosure, an apparatus for processing Device-to-Device (D2D) device identity is provided, which is applied to a D2D device and includes: a second acquisition component, configured to acquire one or more temporary identities; a second transmission component, configured to transmit a temporary D2D identity report, wherein the one or more temporary identities or one or more indexes of the one or more D2D temporary identities are carried in the temporary D2D identity report; a third receiving component, configured to receive D2D identification success information corresponding to the temporary identity report; and a third acquisition component, configured to acquire a long-term D2D identity and/or D2D application layer identity carried in the D2D identification success information.

In the described embodiment, the device further includes: a fourth receiving component, configured to receive D2D identification failure information corresponding to the temporary identity report; and a second processing component, configured to end an identity marking and identification process in a D2D discovery process.

In the described embodiment, the second acquisition component includes: a filtering component, configured to perform preset-class-based filtration according to at least one piece of the following information of one or more discovered D2D devices: a type of the discovered D2D device, a purpose and type of a temporary D2D identity request transmitted by the discovered D2D device and a type of a service provided by the discovered D2D device; and a third processing component, configured to employ one or more D2D temporary identities obtained by filtration as the acquired one or more temporary identities.

According to one embodiment of the disclosure, an apparatus for processing Device-to-Device (D2D) device identity is provided, which is applied to a D2D discovery system and includes: a fifth receiving component, configured to receive a temporary D2D identity request; a first judgment component, configured to judge whether to accept the temporary D2D identity request according to a preset strategy; a third processing component, configured to, when the first judgement component accepts the temporary D2D identity request, transmit temporary identity authorization corresponding to the temporary D2D identity request; and an establishment and updating component, configured to establish or update a first mapping relationship between a temporary D2D identity and a long-term D2D identity of the D2D device marked by the temporary D2D identity, and/or establish or update a second mapping relationship between the temporary D2D identity and a D2D application layer identity of the D2D device marked by the temporary D2D identity.

In the described embodiment, the device further includes: a fourth processing component, configured to, when the D2D discovery system does not accept the temporary D2D identity request, transmit temporary D2D identity authorization failure information corresponding to the temporary D2D identity request.

In the described embodiment, the first judgement component includes: a first determination component, configured to determine whether the temporary D2D identity request is allowed to be accepted according to a preset network strategy and a current network condition; a first authentication component, configured to perform legality authentication on the D2D device; a fifth processing component, configured to, when the temporary D2D identity request is allowed to be accepted and the D2D device is authenticated to be legal, determine to accept the temporary D2D identity request; and a sixth processing component, configured to, when the temporary D2D identity request is not allowed to be accepted and the D2D device is not authenticated to be legal, determine not to accept the temporary D2D identity request.

In the described embodiment, the first authentication component includes: a fourth acquisition component, configured to acquire a long-term D2D identity and/or D2D application layer identity of the D2D device; and a second authentication component, configured to authenticate the long-term D2D identity and/or the D2D application layer identity.

According to one embodiment of the disclosure, an apparatus for processing Device-to-Device (D2D) device identity is provided, which is applied to a D2D discovery system and includes: a sixth receiving component, configured to receive a temporary D2D identity report, wherein one or more D2D temporary identities or one or more indexes of the one or more D2D temporary identities are carried in the temporary D2D identity report; a second judgement component, configured to detect whether D2D identification over a second D2D device marked by the temporary D2D identity succeeds according to at least one of: the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device; and a third transmission component, configured to, when the identity information of the second D2D device marked by the temporary D2D identity is successfully identified, transmit D2D identification success information corresponding to the temporary D2D identity report.

In the described embodiment, the device further includes: a fourth transmission component, configured to, when the identity information of second D2D device marked by the temporary D2D identity is not identified, transmit D2D identification failure information corresponding to the temporary D2D identity report.

In the described embodiment, the second judgement component includes: a second determination component, configured to detect whether to allow identification over the second D2D device according to a preset network strategy and a current network condition;

a third authentication component, configured to perform legality authentication on a first D2D device transmitting the temporary D2D identity report and the second D2D device;

a seventh processing component, configured to, when the identification over the second D2D device is allowed and authentication results of the third authentication component over the first D2D device and the second D2D device are positive, determine that the identification over the second D2D device succeeds; and an eighth processing component, configured to, when the identification over the second D2D device is not allowed and the authentication results of the third authentication component over the first D2D device and the second D2D device are negative, determine that the identification over the second D2D device fails.

In the described embodiment, the third authentication component includes: a fifth acquisition component, configured to acquire the long-term D2D identity and/or D2D application layer identity of the second D2D device; and a fourth authentication component, configured to authenticate the long-term D2D identity and/or D2D application layer identity of the second D2D device.

In the described embodiment, the third authentication component includes: a sixth acquisition component, configured to acquire a long-term D2D identity and/or D2D application layer identity of the first D2D device, a first filtering list and/or first filtering criterion of the first D2D device, corresponding to the long-term D2D identity of the first D2D device, and/or a second filtering list and/or second filtering criterion of the first D2D device, corresponding to the D2D application layer identity of the first D2D device; a seventh acquisition component, configured to acquire the long-term D2D identity and/or D2D application layer identity of the second D2D device, a third filtering list and/or third filtering criterion of the second D2D device, corresponding to the long-term D2D identity of the second D2D device, and/or a fourth filtering list and/or fourth filtering criterion of the second D2D device, corresponding to the D2D application layer identity of the second D2D device; a fourth authentication component, configured to authenticate the long-term D2D identity of the first D2D device and the long-term D2D identity of the second D2D device according to first information, wherein the first information comprises: the long-term D2D identity of the first D2D device, the long-term D2D identity of the second D2D device, the first filtering list and/or the first filtering criterion, and the third filtering list and/or the third filtering criterion; and a fifth authentication component, configured to authenticate the D2D application layer identity of the first D2D device and the D2D application layer identity of the second D2D device according to second information, wherein the second information comprises: the D2D application layer identity of the first D2D device, the D2D application layer identity of the second D2D device, the second filtering list and/or the second filtering criterion, and the fourth filtering list and/or the fourth filtering criterion.

In the described embodiment, the seventh acquisition component includes: an eighth acquisition component, configured to acquire the temporary D2D identity corresponding to the second D2D device; a ninth acquisition component, configured to acquire the long-term D2D identity corresponding to the second D2D device according to the first mapping relationship between the temporary D2D identity and long-term D2D identity corresponding to the second D2D device; and/or a tenth acquisition component, configured to acquire the D2D application layer identity corresponding to the second D2D device according to the second mapping relationship between the temporary D2D identity and D2D application layer identity corresponding to the second D2D device.

By the disclosure, the D2D discovery system is adopted to control and authenticate communication among the D2D devices, so that the security risk of direct communication between the device is lowered, meanwhile, time-frequency resources occupied by signalling transmission between the D2D device are reduced, the problem of higher security risk of the communication process in the identity processing process of the D2D device in the related art is solved, and an effect of improving the identity processing security of the D2D device is further achieved.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below with reference to the drawings and the embodiments in detail. It should be noted that the embodiments of the disclosure and the characteristics in the embodiments can be combined under the condition of no conflicts.

A method for processing Device-to-Device (D2D) device identity in the related art has shortcomings as follows:

First, a marking and identification process is independently finished by a D2D device without the centralized management and control of a system. And the system cannot correspondingly authenticate and manage the discovered D2D device and a discovering D2D device in a discovery process, so that the security risk of a communication process is higher; and second, the transmission of encrypted long-term identity information among the D2D devices may occupy a great number of time-frequency resources and increase the power consumption of the discovered D2D device. In addition, if a key is exposed or cracked, the identity information and privacy security of the D2D device may be faced with a higher risk. In the following embodiments, the communication among the D2D devices is controlled and authenticated by the D2D discovery system to lower the security risk of direct communication among the device, and meanwhile, the time-frequency resources occupied by signalling transmission among the D2D devices are reduced, so that the occupied time-frequency resources are reduced to a certain extent.

Description is given below with reference to preferred embodiments, and the following preferred embodiments combine the abovementioned embodiments and preferred implementation modes.

Figure 1:
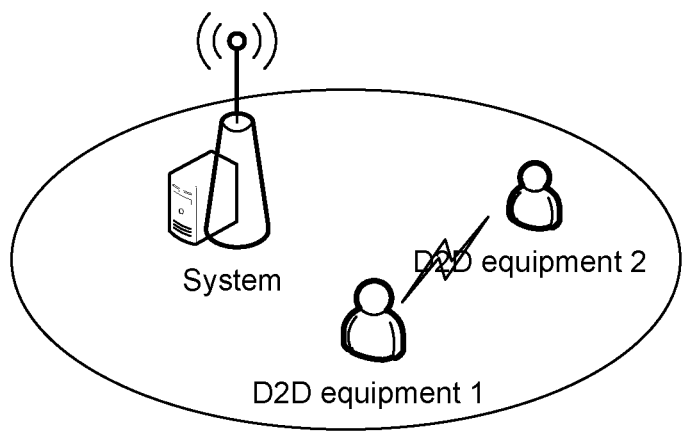
FIG. 1 is a diagram of a cellular-network-based D2D communication mode in a related art.
Figure 2:
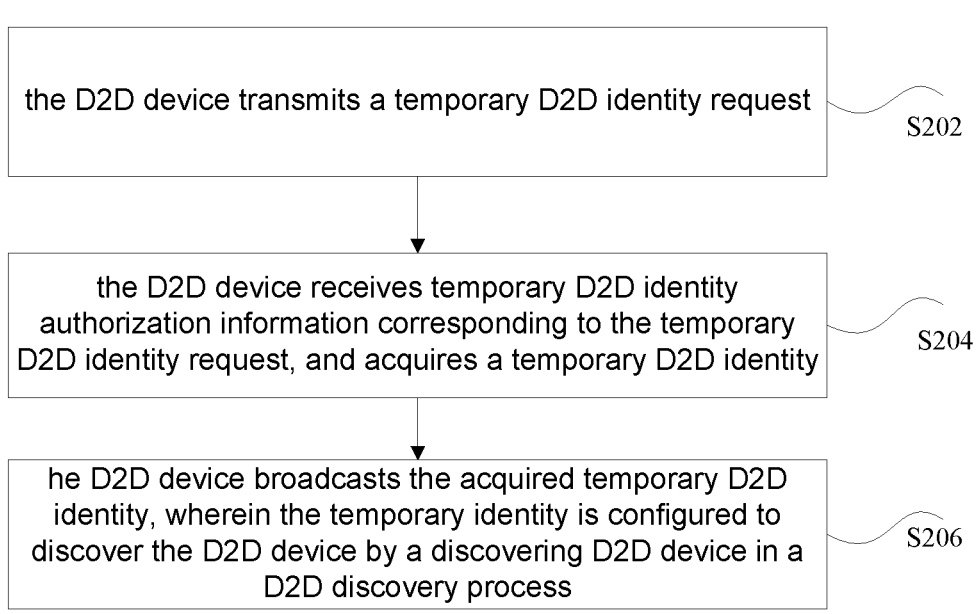
FIG. 2 is a first flowchart of a method for processing Device-to-Device (D2D) device identity according to an embodiment of the disclosure.

This embodiment provides a method for processing Device-to-Device (D2D) device identity, FIG. 2 is a first flowchart of a method for processing Device-to-Device (D2D) device identity according to an embodiment of the disclosure. As shown in FIG. 2, the method includes the following Step 202 to Step 206.

Step 202: the D2D device transmits a temporary D2D identity request.

Step 204: the D2D device receives temporary D2D identity authorization information corresponding to the temporary D2D identity request, and acquires a temporary D2D identity.

Step 206: the D2D device broadcasts the acquired temporary D2D identity, wherein the temporary identity is configured to discover the D2D device by a discovering D2D device in a D2D discovery process.

During implementation, after the D2D device transmits the temporary D2D identity request, the D2D device can also receive temporary D2D identity authorization denial information corresponding to the temporary D2D identity request, and then the D2D device ends an identity marking and identification process in the D2D discovery process. By the preferred implementation mode, an information processing process of a D2D discovery system is improved.

In order to improve the reliability of D2D communication and cut down signalling expenditures, at the same time when the D2D device transmits the temporary D2D identity request, the D2D device reports at least one piece of the following information: a type of the D2D device, a purpose and type of the temporary D2D identity request transmitted by the D2D device and a type of a service provided by the D2D device.

In the preferred embodiment, the temporary D2D identity is used for, within a preset time and a preset area coverage, identifying a temporary identity of the D2D device and/or a temporary identity of a user corresponding to the D2D device.

Figure 3:
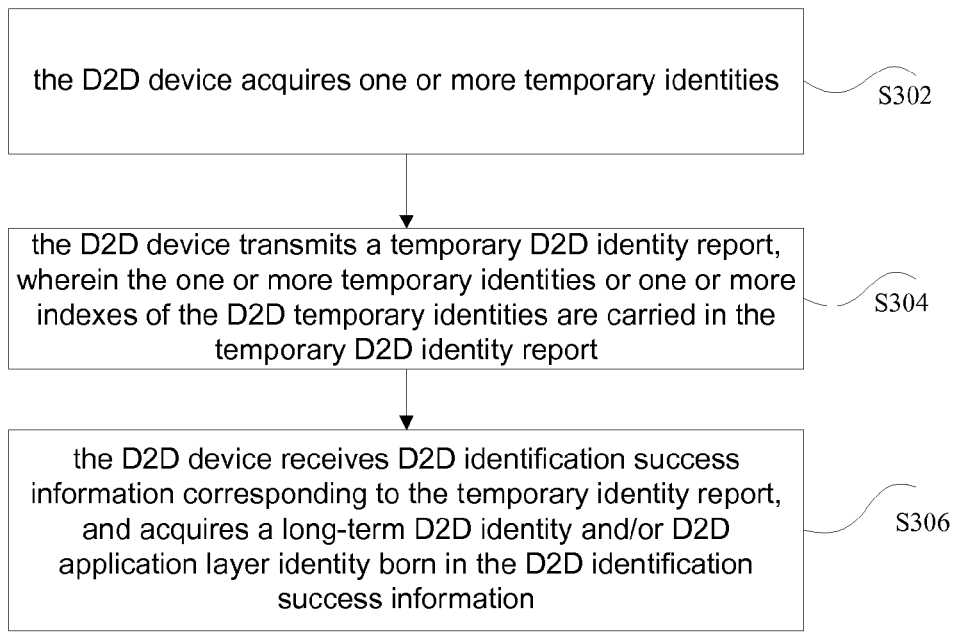
FIG. 3 is a second flowchart of a method for processing Device-to-Device (D2D) device identity according to an embodiment of the disclosure.

The embodiment provides a method for processing Device-to-Device (D2D) device identity, FIG. 3 is a second flowchart of a method for processing Device-to-Device (D2D) device identity according to an embodiment of the disclosure, and as shown in FIG. 3, the method includes the following Step 302 to Step 306.

Step 302: the D2D device acquires one or more temporary identities.

Step 304: the D2D device transmits a temporary D2D identity report, wherein the one or more temporary identities or one or more indexes of the D2D temporary identities are carried in the temporary D2D identity report.

Step 306: the D2D device receives D2D identification success information corresponding to the temporary identity report, and acquires a long-term D2D identity and/or D2D application layer identity born in the D2D identification success information.

During implementation, after the D2D device transmits the temporary D2D identity report, the D2D device receives D2D identification failure information corresponding to the temporary identity report; and the D2D device ends an identity marking and identification process in a D2D discovery process. By the preferred implementation mode, an information processing flow of a D2D discovery system is improved.

During implementation, the D2D device can acquire the one or more D2D temporary identities in multiple implementation manners, and in the preferred embodiment, a convenient manner is provided as an example: the D2D device performs preset-class-based filtration according to at least one piece of the following information of one or more discovered D2D device: a type of the discovered D2D device, a purpose and type of a temporary D2D identity request transmitted by the discovered D2D device and a type of a service provided by the discovered D2D device, and then the D2D device employs one or more D2D temporary identities obtained by filtration as the acquired one or more temporary identities.

As a preferred implementation mode, the temporary D2D identity is configured to identify a temporary identity of the D2D device and/or a temporary identity of a user corresponding to the D2D device within a preset time and a preset area coverage; the long-term D2D identity is configured to carry the long-term identity information of the D2D device and/or the user corresponding to the D2D device; and the D2D application layer identity is configured to identify the application layer identity information of the D2D device and/or the user corresponding to the D2D device in different applications, wherein the D2D device has one or more D2D application layer identities. In the described embodiment, the long-term D2D identity includes one or a combination of: a TMSI, a GUTI, an IMSI, an IMEI, an IP address and D2D device dedicated identity information.

Figure 4:
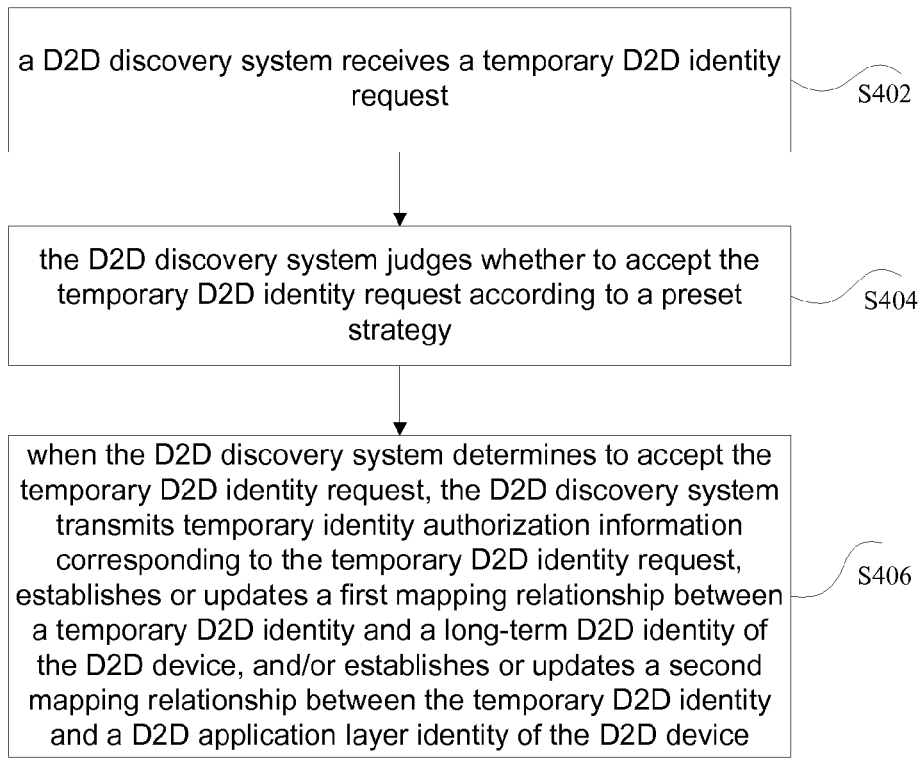
FIG. 4 is a third flowchart of a method for processing Device-to-Device (D2D) device identity according to an embodiment of the disclosure.

The embodiment provides a method for processing Device-to-Device (D2D) device identity, FIG. 4 is a third flowchart of a method for processing Device-to-Device (D2D) device identity according to an embodiment of the disclosure, and as shown in FIG. 4, the method includes the following Step 402 to Step 406.

Step 402: a D2D discovery system receives a temporary D2D identity request.

Step 404: the D2D discovery system judges whether to accept the temporary D2D identity request according to a preset strategy.

Step 406: when the D2D discovery system determines to accept the temporary D2D identity request, the D2D discovery system transmits temporary identity authorization information corresponding to the temporary D2D identity request, establishes or updates a first mapping relationship between a temporary D2D identity and a long-term D2D identity of the D2D device, and/or establishes or updates a second mapping relationship between the temporary D2D identity and a D2D application layer identity of the D2D device.

During implementation, if the judgment result in Step 404 is negative, the D2D discovery system transmits temporary D2D identity authorization denial information corresponding to the temporary D2D identity request.

During implementation, in order to improve the reliability of judging whether the system accepts the temporary D2D identity request, the D2D discovery system determines whether the temporary D2D identity request is allowed to be accepted according to a preset network strategy and a current network condition; the D2D discovery system performs legality authentication on the D2D device; and the D2D discovery system determines to accept the temporary D2D identity request if a determination result is positive and the D2D device is authenticated to be legal, otherwise (i.e., when the temporary D2D identity request is not allowed to be accepted and/or the D2D device is authenticated to be not legal) determines not to accept the temporary D2D identity request.

As a preferred implementation mode, the preset network strategy includes: a supporting strategy of a current network over a D2D discovery function; or the supporting strategy of the current network over the D2D discovery function and at least one of: a type of the discovered D2D device, a purpose and type of the temporary D2D identity request transmitted by the discovered D2D device and a type of a service provided by the discovered D2D device.

The current network condition includes at least one of: a load condition, a radio resource occupation condition and a core network resource occupation condition.

In order to improve the legality authentication accuracy of the D2D device, the D2D discovery system acquires the long-term D2D identity and/or D2D application layer identity of the D2D device; and the D2D discovery system authenticates the long-term D2D identity and/or the D2D application layer identity.

As a preferred implementation mode, the temporary D2D identity is used for identifying, within a preset time and a preset area coverage, a temporary identity of the D2D device and/or a temporary identity of a user corresponding to the D2D device; the long-term D2D identity is used for carrying the long-term identity information of the D2D device and/or the user corresponding to the D2D device; and the D2D application layer identity is used for identifying the application layer identity information of the D2D device and/or the user corresponding to the D2D device in different applications, wherein the D2D device has one or more D2D application layer identities. In the described embodiment, the long-term D2D identity includes one or a combination of: a TMSI, a GUTI, an IMSI, an IMEI, an IP address and D2D device dedicated identity information.

In the described embodiment, the temporary identity authorization information includes: the temporary D2D identity or an index of the temporary D2D identity.

As a preferred implementation mode, the D2D discovery system includes: a network side management entity; or the network side management entity and an application layer management entity. Preferably, the network side management entity includes at least one of: an eNB, an MME, an HSS and a D2D network side dedicated management entity; and the application layer management entity includes at least one of: an RS and a D2D application layer dedicated server.

Figure 5:
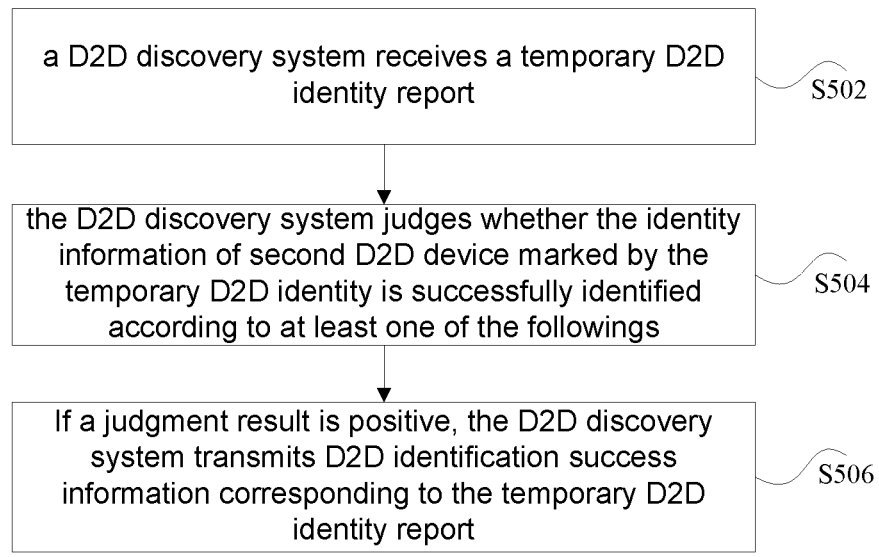
FIG. 5 is a fourth flowchart of a method for processing Device-to-Device (D2D) device identity according to an embodiment of the disclosure.

The embodiment provides a method for processing Device-to-Device (D2D) device identity, FIG. 5 is a fourth flowchart of a method for processing Device-to-Device (D2D) device identity according to an embodiment of the disclosure, and as shown in FIG. 5, the method includes the following Step 502 to Step 506.

Step 502: a D2D discovery system receives a temporary D2D identity report, wherein one or more temporary identities or index(es) of the one or more D2D temporary identities are carried in the temporary D2D identity report.

Step 504: the D2D discovery system judges whether the identity information of second D2D device marked by the temporary D2D identity is successfully identified according to at least one of:

the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device.

Step 506: if a judgment result is positive, the D2D discovery system transmits D2D identification success information corresponding to the temporary D2D identity report.

During implementation, if the judgment result is negative, the D2D discovery system transmits D2D identification failure information corresponding to the temporary D2D identity report.

In order to improve the accuracy of identifying the temporary D2D identity of the second D2D device by the D2D discovery system, the D2D discovery system judges whether to allow identification over the second D2D device according to a preset network strategy and a current network condition; the D2D discovery system performs legality authentication on a first D2D device transmitting the temporary D2D identity report and the second D2D device; and the D2D discovery system determines that the identification over the second D2D device succeeds if a judgement result indicates that the identification over the second D2D device is allowed and authentication results of the D2D discovery system over the first D2D device and the second D2D device are positive, otherwise determines that the identification over the second D2D device fails.

As a preferred implementation mode, the preset network strategy includes: a supporting strategy of a current network over a D2D discovery function; or the supporting strategy of the current network over the D2D discovery function and at least one of: a type of the discovered D2D device, a purpose and type of the temporary D2D identity request transmitted by the discovered D2D device and a type of a service provided by the discovered D2D device.

The current network condition includes:

a maintenance condition of a first mapping relationship between the temporary D2D identity and long-term D2D identity of the second D2D device marked by the temporary D2D identity in the D2D discovery system and/or a second mapping relationship between the temporary D2D identity and D2D application layer identity of the second D2D device; or the maintenance condition and at least one of: a load condition, a radio resource occupation condition and a core network resource occupation condition.

During implementation, in order to improve the second D2D device authentication accuracy of the D2D discovery system, the D2D discovery system can acquire the long-term D2D identity and/or D2D application layer identity of the second D2D device and authenticate the long-term D2D identity and/or the D2D application layer identity of the second D2D device.

During implementation, in order to improve the legality authentication reliability of the D2D discovery system over the first D2D device and the second D2D device, the D2D discovery system acquires a long-term D2D identity and/or D2D application layer identity of the first D2D device, a first filtering list and/or first filtering criterion, corresponding to the long-term D2D identity of the first D2D device, of the first D2D device, and/or a second filtering list and/or second filtering criterion, corresponding to the D2D application layer identity of the first D2D device, of the first D2D device;

the D2D discovery system acquires the long-term D2D identity and/or D2D application layer identity of the second D2D device, a third filtering list and/or third filtering criterion, corresponding to the long-term D2D identity of the second D2D device, of the second D2D device, and/or a fourth filtering list and/or fourth filtering criterion, corresponding to the D2D application layer identity of the second D2D device, of the second D2D device;

the D2D discovery system authenticates the long-term D2D identity of the first D2D device and the long-term D2D identity of the second D2D device according to the following first information, wherein the first information includes: the long-term D2D identity of the first D2D device, the long-term D2D identity of the second D2D device, the first filtering list and/or the first filtering criterion, and the third filtering list and/or the third filtering criterion; and the D2D discovery system authenticates the D2D application layer identity of the first D2D device and the D2D application layer identity of the second D2D device according to the following second information, wherein the second information includes: the D2D application layer identity of the first D2D device, the D2D application layer identity of the second D2D device, the second filtering list and/or the second filtering criterion, and the fourth filtering list and/or the fourth filtering criterion.

As a preferred implementation mode, the step that the D2D discovery system acquires the long-term D2D identity and/or D2D application layer identity of the second D2D device can be implemented in a manner as follows: the D2D discovery system acquires the temporary D2D identity corresponding to the second D2D device; the D2D discovery system acquires the long-term D2D identity corresponding to the second D2D device according to the first mapping relationship between the temporary D2D identity and long-term D2D identity corresponding to the second D2D device; and/or the D2D discovery system acquires the D2D application layer identity corresponding to the second D2D device according to the second mapping relationship between the temporary D2D identity and D2D application layer identity corresponding to the second D2D device.

In the described embodiment, the first filtering list and/or the first filtering criterion include(s) at least one of:

the long-term D2D identity of the second D2D device which is allowed or not allowed to be discovered by the first D2D device, and a set of D2D long-term identities of a group of second D2D device which is allowed or not allowed to be discovered by the first D2D device and has the same characteristic;

the second filtering list and/or the second filtering criterion include(s) at least one of:

the D2D application layer identity of the second D2D device which is allowed or not allowed to be discovered by the first D2D device, and a set of D2D application layer identities of a group of second D2D device which is allowed or not allowed to be discovered by the first D2D device and has the same characteristic;

the third filtering list and/or the third filtering criterion include(s) at least one of:

the long-term D2D identity of the first D2D device which is allowed or not allowed to be discovered by the second D2D device, and a set of D2D long-term identities of a group of first D2D device which is allowed or not allowed to be discovered by the second D2D device and has the same characteristic; and the fourth filtering list and/or the fourth filtering criterion include(s) at least one of:

the D2D application layer identity of the first D2D device which is allowed or not allowed to be discovered by the second D2D device, and a set of D2D application layer identities of a group of first D2D device which is allowed or not allowed to be discovered by the second D2D device and has the same characteristic.

As a preferred implementation mode, the D2D identification success information includes: the authenticated long-term D2D identity of the second D2D device and/or the authenticated D2D application layer identity of the second D2D device marked in the temporary D2D identity report.

In the described embodiment, the temporary D2D identity is configured to identify a temporary identity of the D2D device and/or a temporary identity of a user corresponding to the D2D device within a preset time and a preset area coverage; the long-term D2D identity is configured to carry the long-term identity information of the D2D device and/or the user corresponding to the D2D device; and the D2D application layer identity is configured to identify the application layer identity information of the D2D device and/or the user corresponding to the D2D device in different applications, wherein the D2D device has one or more D2D application layer identities. Preferably, the long-term D2D identity includes one or a combination of: a TMSI, a GUTI, an IMSI, an IMEI, an IP address and D2D device dedicated identity information.

It should be noted that the steps shown in the flowcharts in the drawings can be executed in a computer system, for example, a group of computers, capable of executing an instruction, and moreover, although a logic sequence is shown in the flowcharts, the shown or described steps can be executed according to a sequence different from the logic sequence under a certain condition.

In another embodiment, identity processing software for a D2D device is also provided, which is configured to execute the technical solutions described in the abovementioned embodiments and preferred embodiments.

In another embodiment, a storage medium is also provided, in which the identity processing software for the D2D device is stored, wherein the storage medium includes, but not limited to: an optical disk, a floppy disk, a hard disk, an erasable memory and the like.

The embodiment of the disclosure also provides an apparatus for processing Device-to-Device (D2D) device identity, which can be applied to the D2D device. The identity processing device for the D2D device can be configured to implement the identity processing methods for the D2D device and the preferred implementation modes, what has been described will not be repeated, and components involved in the identity processing device for the D2D device are described below. For example, the term "component", used below, is a combination of software and/or hardware for realizing preset functions. The system and method described in the following embodiment are preferably implemented by software, but the implementation of the system and the method with hardware or the combination of software and hardware is also possible and conceived.

Figure 6:
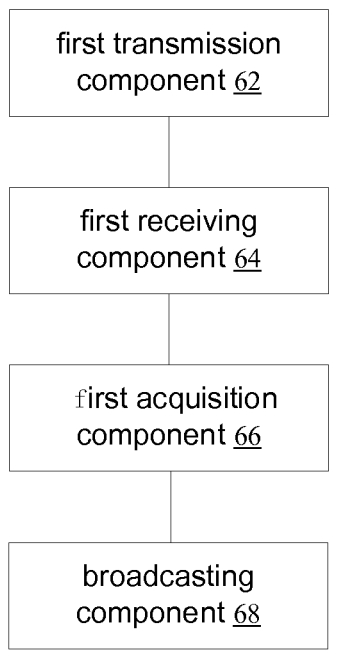
FIG. 6 is a first structure diagram of an apparatus for processing Device-to-Device (D2D) device identity according to an embodiment of the disclosure.

FIG. 6 is a first structure diagram of an apparatus for processing Device-to-Device (D2D) device identity according to an embodiment of the disclosure, and as shown in FIG. 6, the device includes: a first transmission component 62, a first receiving component 64, a first acquisition component 66 and a broadcasting component 68. The structure is described below in detail.

The first transmission component 62 is configured to transmit a temporary D2D identity request; the first receiving component 64 is connected to the first transmission component 62, and is configured to receive temporary D2D identity authorization information corresponding to the temporary D2D identity request; the first acquisition component 66 is connected to the first receiving component 64, and is configured to acquire a temporary D2D identity; and the broadcasting component 68 is connected to the first acquisition component 66, and is configured to broadcast the temporary D2D identity acquired by the first acquisition component 66, wherein the temporary identity is configured to discover the D2D device by a discovering D2D device in a D2D discovery process.

Figure 7:
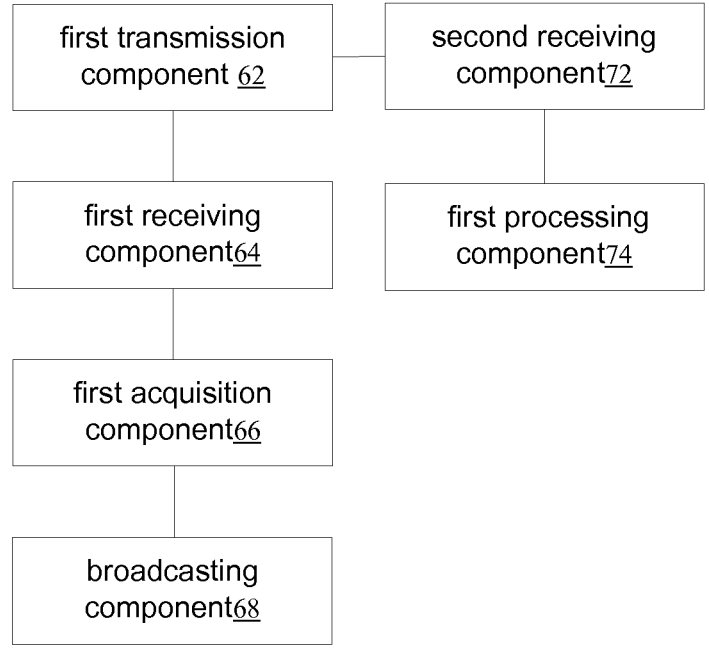
FIG. 7 is a preferred first structure diagram of an apparatus for processing Device-to-Device (D2D) device identity according to an embodiment of the disclosure.

FIG. 7 is a preferred first structure diagram of the identity processing device for the D2D device according to the embodiment of the disclosure, and as shown in FIG. 7, the device further includes: a second receiving component 72 and a first processing component 74. The structure is described below in detail.

The second receiving component 72 is connected to the first transmission component 62, and is configured to receive temporary D2D identity authorization failure information corresponding to the temporary D2D identity request; and the first processing component 74 is connected to the second receiving component 72, and is configured to end an identity marking and identification process in the D2D discovery process.

In another embodiment, identity processing software for D2D device is also provided, which is configured to execute the technical solutions described in the abovementioned embodiments and preferred embodiments.

In another embodiment, a storage medium is also provided, in which the identity processing software for the D2D device is stored, wherein the storage medium includes, but not limited to: an optical disk, a floppy disk, a hard disk, an erasable memory and the like.

The embodiment of the disclosure also provides an apparatus for processing Device-to-Device (D2D) device identity, which can be applied to the D2D device. The identity processing device for the D2D device can be configured to implement the identity processing methods for the D2D device and the preferred implementation modes, what has been described will not be repeated, and components involved in the identity processing device for the D2D device are described below. For example, the term "component", used below, is a combination of software and/or hardware for realizing preset functions. The system and method described in the following embodiment are preferably implemented by software, but the implementation of the system and the method with hardware or the combination of software and hardware is also possible and conceived.

Figure 8:
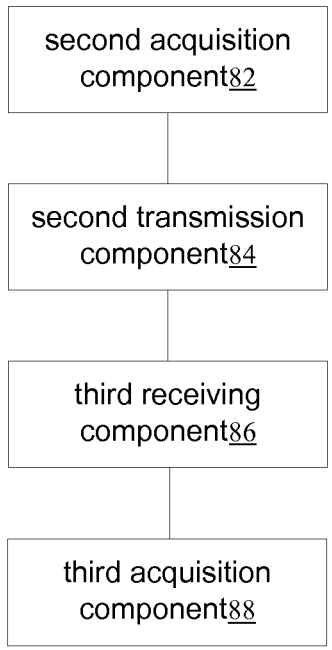
FIG. 8 is a second structure diagram of an apparatus for processing Device-to-Device (D2D) device identity according to an embodiment of the disclosure.

FIG. 8 is a second structure diagram of an apparatus for processing Device-to-Device (D2D) device identity according to an embodiment of the disclosure, and as shown in FIG. 8, the device includes: a second acquisition component 82, a second transmission component 84, a third receiving component 86 and a third acquisition component 88. The structure is described below in detail.

The second acquisition component 82 is configured to acquire one or more temporary identities; the second transmission component 84 is connected to the second acquisition component 82, and is configured to transmit a temporary D2D identity report, wherein the one or more temporary identities or index(es) of the one or more D2D temporary identities are carried in the temporary D2D identity report; the third receiving component 86 is connected to the second transmission component 84, and is configured to receive D2D identification success information corresponding to the temporary identity report; and the third acquisition component 88 is connected to the third receiving component 86, and is configured to acquire a long-term D2D identity and/or D2D application layer identity carried in the D2D identification success information.

Figure 9:
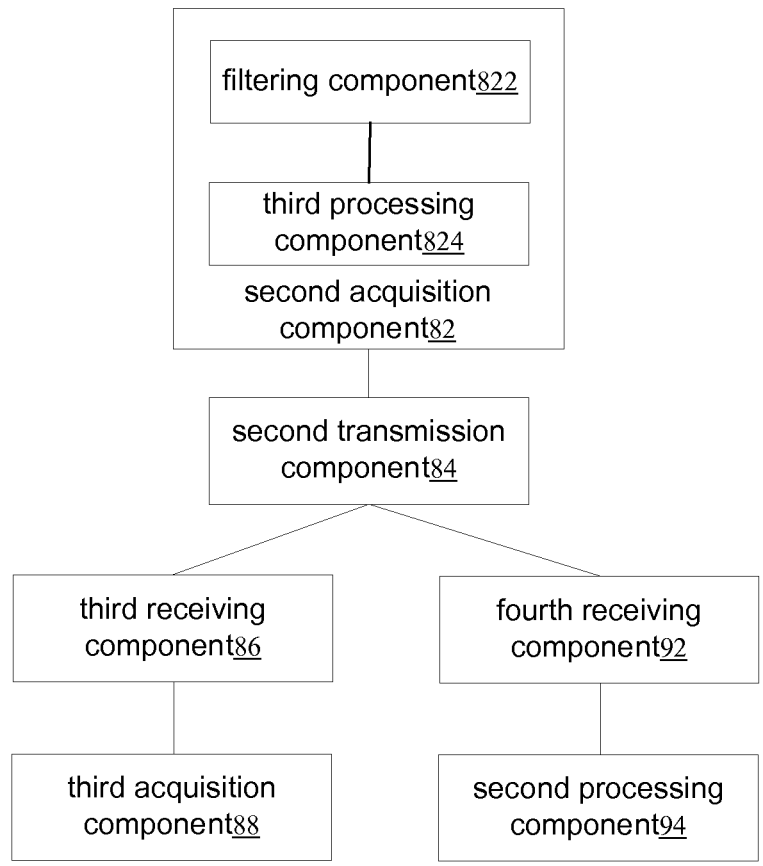
FIG. 9 is a preferred second structure diagram of an apparatus for processing Device-to-Device (D2D) device identity according to an embodiment of the disclosure.

FIG. 9 is a preferred second structure diagram of the identity processing device for the D2D device according to the embodiment of the disclosure, and as shown in FIG. 9, the device further includes: a fourth receiving component 92 and a second processing component 94. The second acquisition component 82 includes: a filtering component 822 and a third processing component 824. The structure is described below in detail.

The fourth receiving component 92 is connected to the second transmission component 84, and is configured to receive D2D identification failure information corresponding to the temporary identity report; and the second processing component 94 is connected to the fourth receiving component 92, and is configured to end an identity marking and identification process in a D2D discovery process.

In the described embodiment, the second acquisition component 82 includes: the filtering component 822, configured to perform preset-class-based filtration according to at least one piece of the following information of one or more discovered D2D devices: a type of the discovered D2D device, a purpose and type of the temporary D2D identity request transmitted by the discovered D2D device and a type of a service provided by the discovered D2D device; and the third processing component 824, connected to the filtering component 822 and configured to employ one or more D2D temporary identities obtained by filtration as the acquired one or more temporary identities.

In another embodiment, identity processing software for a D2D device is also provided, which is configured to execute the technical solutions described in the abovementioned embodiments and preferred embodiments.

In another embodiment, a storage medium is also provided, in which the identity processing software for the D2D device is stored, wherein the storage medium includes, but not limited to: an optical disk, a floppy disk, a hard disk, an erasable memory and the like.

The embodiment of the disclosure also provides an apparatus for processing Device-to-Device (D2D) device identity, which can be applied to a D2D discovery system. The identity processing device for the D2D device can be configured to implement the identity processing methods for the D2D device and the preferred implementation modes, what has been described will not be repeated, and components involved in the identity processing device for the D2D device are described below. For example, the term "component", used below, is a combination of software and/or hardware for realizing preset functions. The system and method described in the following embodiment are preferably implemented by software, but the implementation of the system and the method with hardware or the combination of software and hardware is also possible and conceived.

Figure 10:
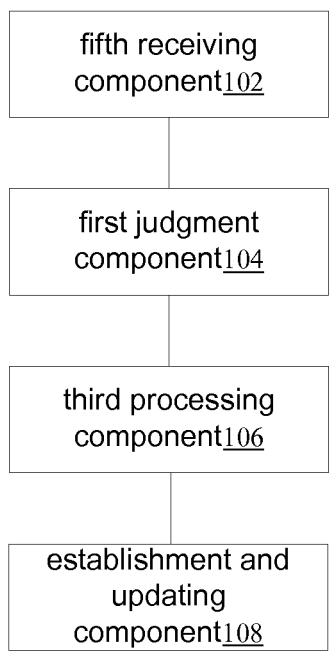
FIG. 10 is a third structure diagram of an apparatus for processing Device-to-Device (D2D) device identity according to an embodiment of the disclosure.

FIG. 10 is a third structure diagram of an apparatus for processing Device-to-Device (D2D) device identity according to an embodiment of the disclosure, and as shown in FIG. 10, the device includes: a fifth receiving component 102, a first judgment component 104, a third processing component 106 and an establishment and updating component 108. The structure is described below in detail.

The fifth receiving component 102 is configured to receive a temporary D2D identity request; the first judgment component 104 is connected to the fifth receiving component 102, and is configured to judge whether to accept the temporary D2D identity request according to a preset strategy; the third processing component 106 is connected to the first judgment component 104, and is configured to, if a judgement result of the first judgment component 104 is positive, transmit temporary identity authorization information corresponding to the temporary D2D identity request; and the establishment and updating component 108 is connected to the third processing component 106, and is configured to establish or update a first mapping relationship between a temporary D2D identity and long-term D2D identity of the D2D device marked by the temporary D2D identity, and/or establish or update a second mapping relationship between the temporary D2D identity and a D2D application layer identity of the D2D device marked by the temporary D2D identity.

Figure 11:
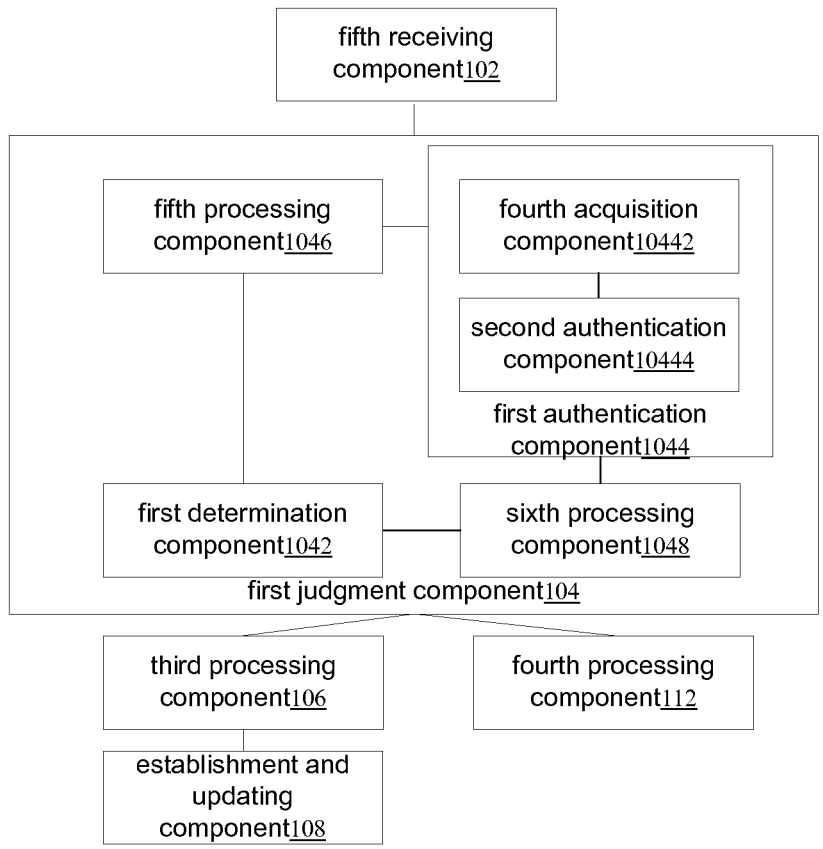
FIG. 11 is a preferred third structure diagram of an apparatus for processing Device-to-Device (D2D) device identity according to an embodiment of the disclosure.

FIG. 11 is a preferred third structure diagram of the identity processing device for the D2D device according to the embodiment of the disclosure, and as shown in FIG. 11, the device further includes: a fourth processing component 112. The first judgment component 104 includes: a first determination component 1042, a first authentication component 1044, a fifth processing component 1046 and a sixth processing component 1048, wherein the first authentication component 1044 includes: a fourth acquisition component 10442 and a second authentication component 10444. The structure is described below in detail.

The fourth processing component 112 is connected to the first judgment component 104, and is configured to, if the judgement result of the first judgement component 104 is negative, transmit temporary D2D identity authorization failure information corresponding to the temporary D2D identity request.

In the described embodiment, the first judgment component 104 includes: the first determination component 1042, configured to determine whether the temporary D2D identity request is allowed to be accepted according to a preset network strategy and a current network condition; the first authentication component 1044, configured to perform legality authentication on the D2D device; the fifth processing component 1046, connected to the first determination component 1042 and the first authentication component 1044 and configured to, if a determination result of the first determination component 1042 is positive and an authentication result of the first authentication component 1044 is positive, determine to accept the temporary D2D identity request; and the sixth processing component 1048, connected to the first determination component 1042 and the first authentication component 1044 and configured to, if the determination result of the first determination component 1042 is negative and the authentication result of the first authentication component 1044 is negative, determine not to accept the temporary D2D identity request.

In the described embodiment, the first authentication component 1044 includes: a fourth acquisition component 10442, configured to acquire a long-term D2D identity and/or D2D application layer identity of the D2D device; and a second authentication component 10444, connected to the fourth acquisition component 10442 and configured to authenticate the long-term D2D identity and/or the D2D application layer identity.

In another embodiment, identity processing software for D2D device is also provided, which is configured to execute the technical solutions described in the abovementioned embodiments and preferred embodiments.

In another embodiment, a storage medium is also provided, in which the identity processing software for the D2D device is stored, wherein the storage medium includes, but not limited to: an optical disk, a floppy disk, a hard disk, an erasable memory and the like.

The embodiment of the disclosure also provides an apparatus for processing Device-to-Device (D2D) device identity, which can be applied to a D2D discovery system. The identity processing device for the D2D device can be configured to implement the identity processing methods for the D2D device and the preferred implementation modes, what has been described will not be repeated, and components involved in the identity processing device for the D2D device are described below. For example, the term "component", used below, is a combination of software and/or hardware for realizing preset functions. The system and method described in the following embodiment are preferably implemented by software, but the implementation of the system and the method with hardware or the combination of software and hardware is also possible and conceived.

Figure 12:
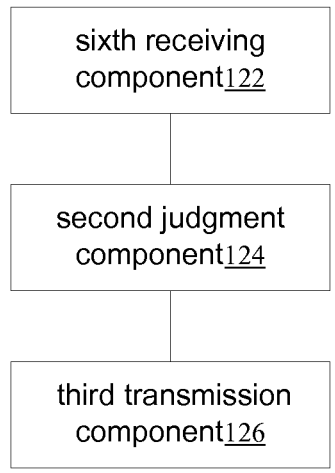
FIG. 12 is a fourth structure diagram of an apparatus for processing Device-to-Device (D2D) device identity according to an embodiment of the disclosure.

FIG. 12 is a fourth structure diagram of an apparatus for processing Device-to-Device (D2D) device identity according to an embodiment of the disclosure, and as shown in FIG. 12, the device includes: a sixth receiving component 122, a second judgment component 124 and a third transmission component 126. The structure is described below in detail.

The sixth receiving component 122 is configured to receive a temporary D2D identity report, wherein one or more temporary identities or index(es) of the one or more D2D temporary identities are carried in the temporary D2D identity report; the second judgment component 124 is connected to the sixth receiving component 122, and is configured to judge whether D2D identification over second D2D device marked by the temporary D2D identity succeeds according to at least one of:

the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device; and the third transmission component 126 is connected to the second judgment component 124, and is configured to, if a judgment result of the second judgment component 124 is positive, transmit D2D identification success information corresponding to the temporary D2D identity report.

Figure 13:
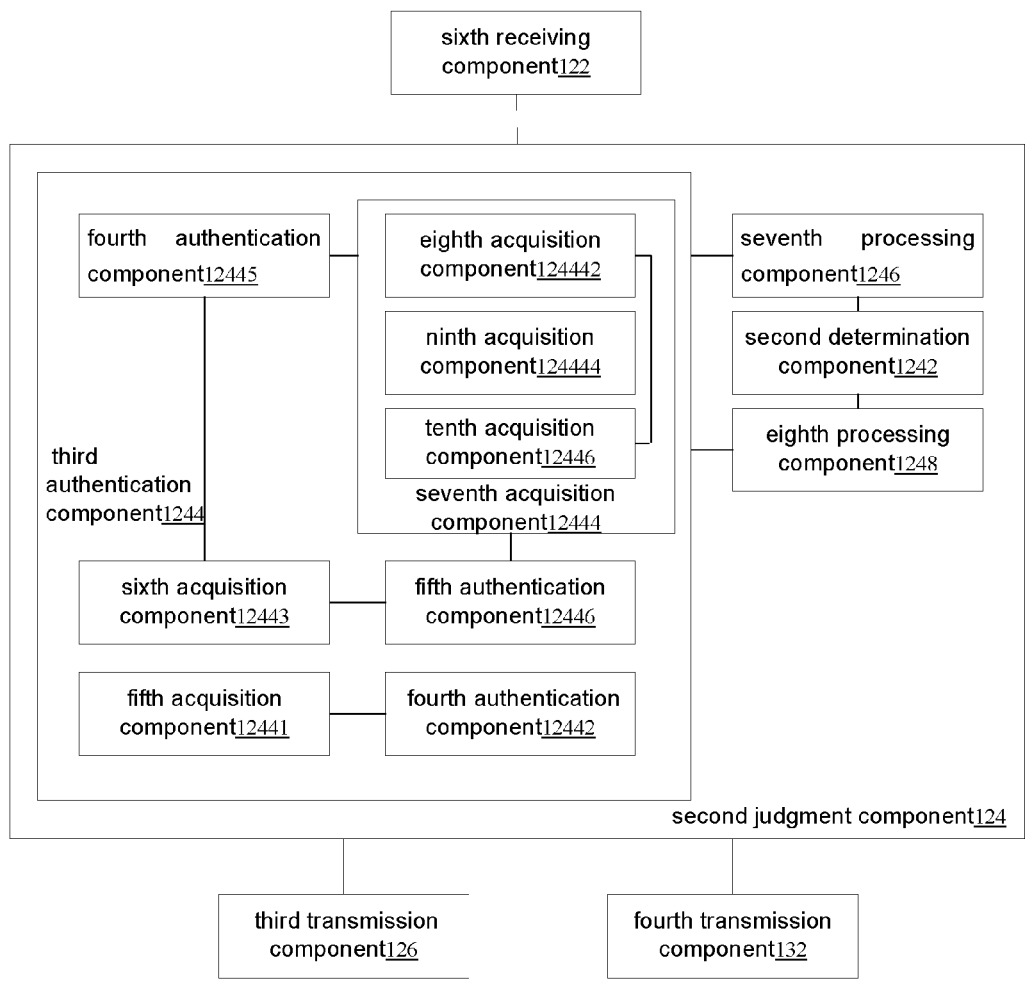
FIG. 13 is a preferred fourth structure diagram of an apparatus for processing Device-to-Device (D2D) device identity according to an embodiment of the disclosure.

FIG. 13 is a preferred fourth structure diagram of the identity processing device for the D2D device according to the embodiment of the disclosure, and as shown in FIG. 13, the device further includes: a fourth transmission component 132. The second judgment component 124 includes: a second determination component 1242, a third authentication component 1244, a seventh processing component 1246 and an eighth processing component 1248, wherein the third authentication component 1244 includes: a fifth acquisition component 12441, a fourth authentication component 12442, a sixth acquisition component 12443, a seventh acquisition component 12444, a fourth authentication component 12445 and a fifth authentication component 12446; and preferably, the seventh acquisition component 12444 includes: an eighth acquisition component 124442, a ninth acquisition component 124444 and a tenth acquisition component 124446. The structure is described below in detail.

The fourth transmission component 132 is connected to the second judgment component 124, and is configured to, if the judgment result of the second judgment component 124 is negative, transmit D2D identification failure information corresponding to the temporary D2D identity report.

In the described embodiment, the second judgment component 124 includes: the second determination component 1242, configured to determine whether to allow identification over the second D2D device according to a preset network strategy and a current network condition; the third authentication component 1244, configured to perform legality authentication on a first D2D device transmitting the temporary D2D identity report and the second D2D device; the seventh processing component 1246, configured to determine that the identification over the second D2D device succeeds if a determination result of the second determination component indicates that the identification over the second D2D device is allowed and authentication results of the third authentication component over the first D2D device and the second D2D device are positive; and the eighth processing component 1248, configured to determine that the identification over the second D2D device fails if the determination result of the second determination component indicates that the identification over the second D2D device is not allowed and the authentication results of the third authentication component over the first D2D device and the second D2D device are negative.

In the described embodiment, the third authentication component 1244 includes: the fifth acquisition component 12441, configured to acquire the long-term D2D identity and/or D2D application layer identity of the second D2D device; and the fourth authentication component 12442, connected to the fifth acquisition component 12441 and configured to authenticate the long-term D2D identity and/or D2D application layer identity of the second D2D device.

In the described embodiment, the third authentication component 1244 includes: the sixth acquisition component 12443, configured to acquire a long-term D2D identity and/or D2D application layer identity of the first D2D device, a first filtering list and/or first filtering criterion, corresponding to the long-term D2D identity of the first D2D device, of the first D2D device, and/or a second filtering list and/or second filtering criterion, corresponding to the D2D application layer identity of the first D2D device, of the first D2D device; the seventh acquisition component 12444, configured to acquire the long-term D2D identity and/or D2D application layer identity of the second D2D device, a third filtering list and/or third filtering criterion, corresponding to the long-term D2D identity of the second D2D device, of the second D2D device, and/or a fourth filtering list and/or fourth filtering criterion, corresponding to the D2D application layer identity of the second D2D device, of the second D2D device; the fourth authentication component 12445, connected to the sixth acquisition component 12443 and the seventh acquisition component 12444 and configured to authenticate the long-term D2D identity of the first D2D device and the long-term D2D identity of the second D2D device according to the following first information, wherein the first information includes: the long-term D2D identity of the first D2D device, the long-term D2D identity of the second D2D device, the first filtering list and/or the first filtering criterion, and the third filtering list and/or the third filtering criterion; and the fifth authentication component 12446, connected to the sixth acquisition component 12443 and the seventh acquisition component 12444 and configured to authenticate the D2D application layer identity of the first D2D device and the D2D application layer identity of the second D2D device according to the following second information, wherein the second information includes: the D2D application layer identity of the first D2D device, the D2D application layer identity of the second D2D device, the second filtering list and/or the second filtering criterion, and the fourth filtering list and/or the fourth filtering criterion.

In the described embodiment, the seventh acquisition component 12444 includes: the eighth acquisition component 124442, configured to acquire the temporary D2D identity corresponding to the second D2D device; the ninth acquisition component 124444, connected to the eighth acquisition component 124442 and configured to acquire the long-term D2D identity corresponding to the second D2D device according to the first mapping relationship between the temporary D2D identity and long-term D2D identity corresponding to the second D2D device; and/or the tenth acquisition component 124446, connected to the eighth acquisition component 124442 and configured to acquire the D2D application layer identity corresponding to the second D2D device according to the second mapping relationship between the temporary D2D identity and D2D application layer identity corresponding to the second D2D device.

Preferred Embodiment 1

The disclosure provides a method for identity marking and identification during D2D discovery, which includes the identity marking and identification of a discovered device and/or its user by virtue of two or three types of identities.

In this preferred embodiment, the two types of identities are a temporary D2D identity and a long-term D2D identity respectively, and the three types of identities are the temporary D2D identity, the long-term D2D identity and a D2D application layer identity respectively.

In the described embodiment, the temporary D2D identity is configured to mark the temporary D2D identity of the discovered device and/or its user and carry its temporary identity information. The temporary D2D identity information includes simple information such as a type of the discovered device, a purpose and type of an initiated request and a type of a provided service.

In the described embodiment, the temporary D2D identity is valid within a certain time period and a certain area coverage only, the temporary D2D identity may be invalidated at the end of a life cycle of the temporary D2D identity or the discovered device which has acquired the temporary D2D identity is moved out of a certain area. And the temporary D2D identity needs to be requested for if a D2D discovery process of the discovered device is still required, and the re-acquired identity can be different from the identity acquired before.

In the described embodiment, the long-term D2D identity is an identity which has been recorded in a system before the D2D discovery process is started, is bound with device hardware or a user identity and can uniquely mark the device or the user in a network, and is configured to carry the long-term identity information of the discovered device and/or the user.

During implementation, the long-term D2D identity may include at least one or a combination of more of a TMSI, a GUTI, an IMSI, an IP address and D2D device dedicated identity information of the discovered device.

In the described embodiment, the D2D application layer identity is configured to carry the application layer identity information of the discovered device and/or its user in different applications. A discovered device and/or its user can have one or more D2D application layer identities.

In the described embodiment, the D2D application layer identity mainly includes information such as an account, a nickname, the gender and a service type of the user.

In the described embodiment, identification during D2D discovery includes the identification of the long-term D2D identity and/or the identification of the D2D application layer identity.

By the solution of the preferred embodiment, radio resources can be saved, terminal power consumption can be lowered, the privacy of the user can be fully protected, and security can be ensured.

Preferred Embodiment 2

Figure 14:
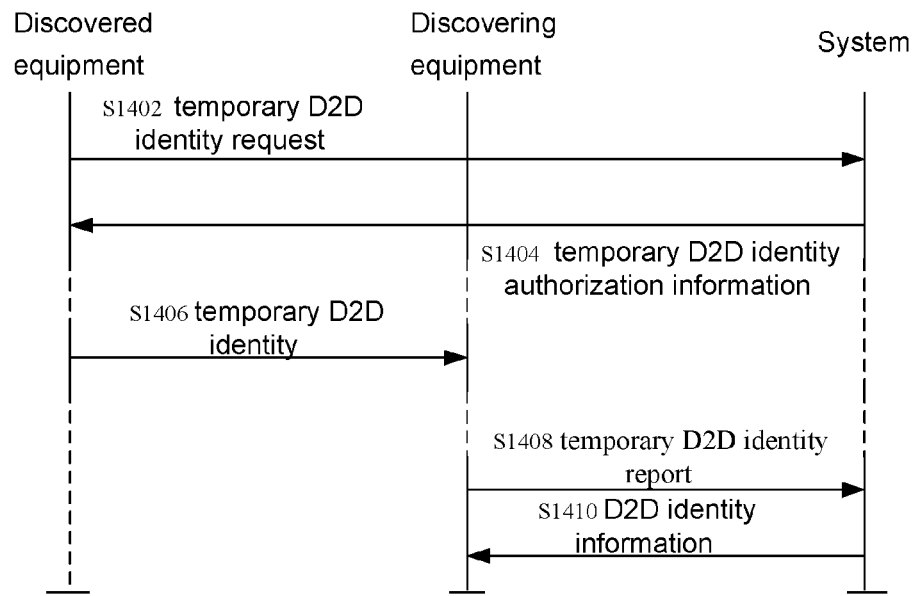
FIG. 14 is a first flowchart of a user identity marking and identification method for a discovered device side during D2D discovery according to an embodiment of the disclosure.

The preferred embodiment provides an identity marking and identification method for D2D discovery. FIG. 14 is a first flowchart of a user identity marking and identification method for a discovered device side during D2D discovery according to an embodiment of the disclosure, and as shown in FIG. 14, the method includes the following Step 1402 to Step 1410.

Step 1402: a discovered device transmits a temporary D2D identity request.

Step 1404: a D2D discovery system feeds back temporary D2D identity authorization information.

Step 1406: the discovered device transmits a temporary D2D identity to a discovering device.

Step 1408: the discovering device transmits a temporary D2D identity report to the D2D discovery system.

Step 1410: the D2D discovery system feeds back D2D identity information to the discovering device.

Preferred Embodiment 3

Figure 15:
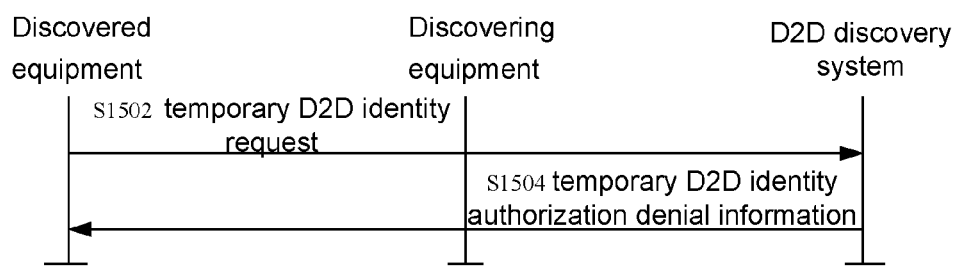
FIG. 15 is a second flowchart of a user identity marking and identification method for a discovered device side during D2D discovery according to an embodiment of the disclosure.

The preferred embodiment provides an identity marking and identification method for D2D discovery. FIG. 15 is a second flowchart of a user identity marking and identification method for a discovered device side during D2D discovery according to an embodiment of the disclosure, and as shown in FIG. 15, the method includes the following Step 1502 to Step 1504.

Step 1502: a discovered device transmits a temporary D2D identity request.

Step 1504: a D2D discovery system feeds back temporary D2D identity authorization denial information.

Preferred Embodiment 4

Figure 16:
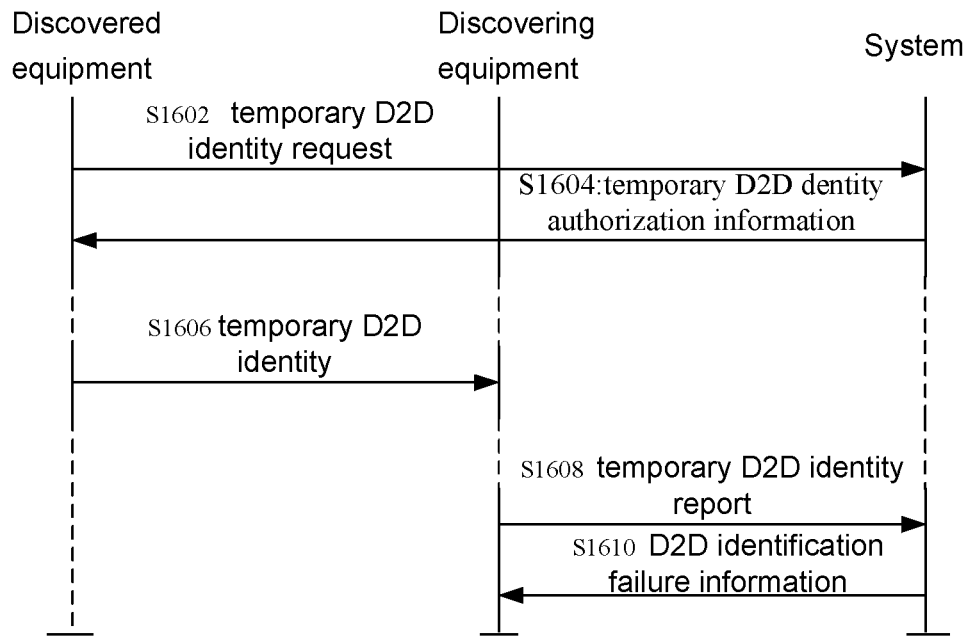
FIG. 16 is a third flowchart of a user identity marking and identification method for a discovered device side during D2D discovery according to an embodiment of the disclosure.

The preferred embodiment provides an identity marking and identification method for D2D discovery. FIG. 16 is a second flowchart of a user identity marking and identification method for a discovered device side during D2D discovery according to an embodiment of the disclosure, and as shown in FIG. 16, the method includes the following Step 1602 to Step 1610.

Step 1602: a discovered device transmits a temporary D2D identity request.

Step 1604: a D2D discovery system feeds back temporary D2D identity authorization information.

Step 1606: the discovered device transmits a temporary D2D identity to a discovering device.

Step 1608: the discovering device transmits a temporary D2D identity report to the D2D discovery system.

Step 1610: the D2D discovery system feeds back D2D identification failure information to the discovering device.

Preferred Embodiment 5

Figure 17:
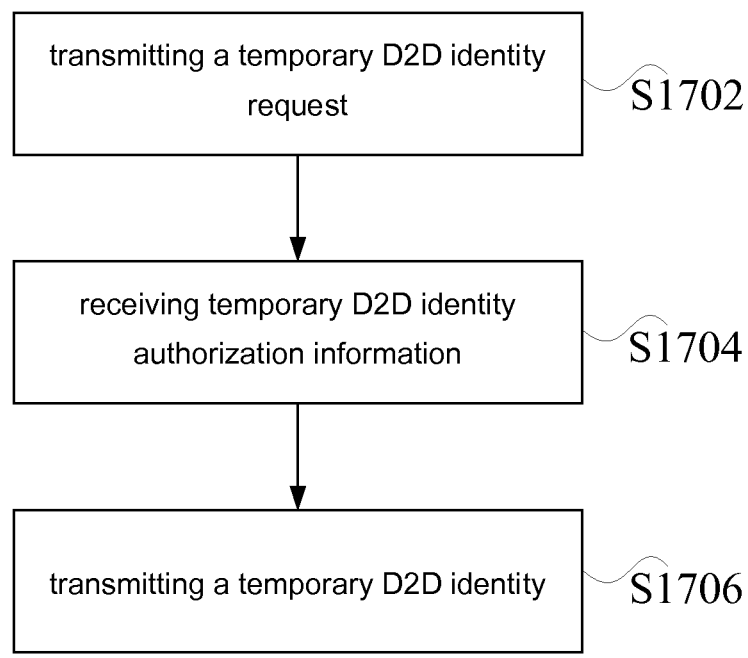
FIG. 17 is a fourth flowchart of a user identity marking and identification method for a discovered device side during D2D discovery according to an embodiment of the disclosure.

The preferred embodiment provides an identity marking and identification method for D2D discovery, and describes steps executed by a discovered device. FIG. 17 is a third flowchart of a user identity marking and identification method for the discovered device side during D2D discovery according to an embodiment of the disclosure. As shown in FIG. 17, the method includes the following Step 1702 to Step 1706.

Step 1702: the discovered device transmits a temporary D2D identity request.

Step 1704: the discovered device receives temporary D2D identity authorization information.

Step 1706: the discovered device acquires a temporary D2D identity after receiving the temporary D2D identity authorization information, and broadcasts the acquired temporary D2D identity.

Preferred Embodiment 6

Figure 18:
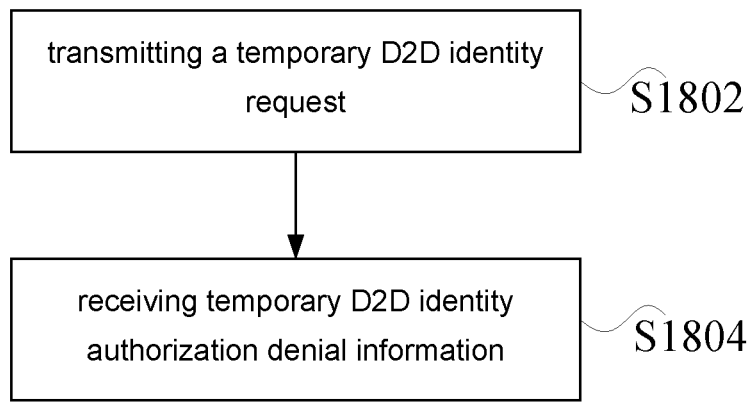
FIG. 18 is a fifth flowchart of a user identity marking and identification method for a discovered device side during D2D discovery according to an embodiment of the disclosure.

The preferred embodiment provides an identity marking and identification method for D2D discovery, and describes steps executed by a discovered device. FIG. 18 is a fifth flowchart of a user identity marking and identification method for the discovered device side during D2D discovery according to an embodiment of the disclosure. As shown in FIG. 18, the method includes the following Step 1802 to Step 1804.

Step 1802: the discovered device transmits a temporary D2D identity request.

Step 1804: the discovered device receives temporary D2D identity authorization denial information, and ends an identity marking and identification process during the D2D discovery.

As a preferred implementation mode, the discovered device also reports at least one or more pieces of information such as a type of the discovered device, a purpose and type of the initiated request and a type of a provided service when transmitting the temporary D2D identity request.

As another preferred implementation mode, the temporary D2D identity authorization denial information further includes one or more pieces of information such as a denial reason and a backspace instruction.

Preferred Embodiment 7

Figure 19:
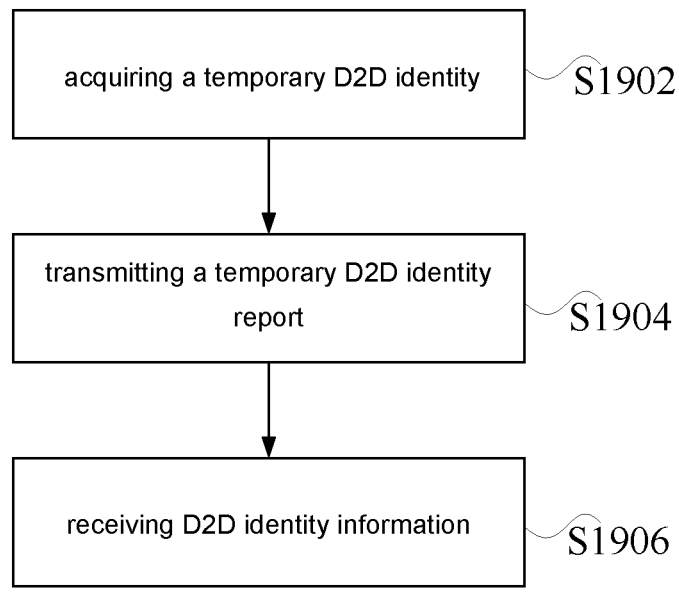
FIG. 19 is a first flowchart of an identity marking and identification method for a discovered device side according to an embodiment of the disclosure.

The preferred embodiment provides an identity marking and identification method for D2D discovery, and describes steps executed by a discovering device. FIG. 19 is a first flowchart of an identity marking and identification method for a discovering device side according to an embodiment of the disclosure. As shown in FIG. 19, the method includes the following Step 1902 to Step 1906.

Step 1902: the discovering device searches for and acquires a temporary D2D identity.

Step 1904: the discovering device transmits a temporary D2D identity report.

Step 1906: the discovering device receives D2D identity information.

In the described embodiment, if the D2D identity information is received, a long-term D2D identity and/or D2D application layer identity, which are/is carried in the D2D identity information, of the discovered device are/is acquired.

As a preferred implementation mode, Step 1902 that the discovering device searches for and acquires the temporary D2D identity further includes that the discovering device performs class-based searching and filtration on the temporary D2D identity according to a type of the discovered device, a purpose and type of an initiated request and a type of a provided service, and employs a temporary D2D identity obtained by searching and filtration as the acquired temporary D2D identity.

In the described embodiment, the temporary D2D identity report at least includes one or more acquired D2D temporary identities and index(es) of the one or more D2D temporary identities of one or more the discovered devices.

As another preferred implementation mode, D2D identification failure information further includes information such as a failure reason.

Preferred Embodiment 8

Figure 20:
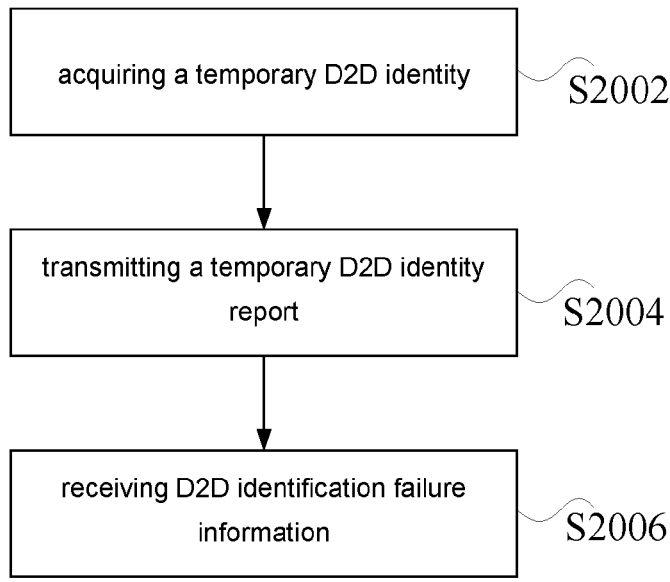
FIG. 20 is a second flowchart of an identity marking and identification method for a discovered device side according to an embodiment of the disclosure.

The preferred embodiment provides an identity marking and identification method for D2D discovery, and describes steps executed by a discovering device. FIG. 20 is a second flowchart of an identity marking and identification method for the discovering device side according to an embodiment of the disclosure. As shown in FIG. 20, the method includes the following Step 2002 to Step 2006.

Step 2002: the discovering device searches for and acquires a temporary D2D identity.

Step 2004: the discovering device transmits a temporary D2D identity report.

Step 2006: the discovering device receives D2D identification failure information.

In the described embodiment, if the D2D identification failure information is received, an identity marking and identification process during D2D discovery is ended.

As a preferred implementation mode, Step 2002 that the discovering device searches for and acquires the temporary D2D identity further includes that the discovering device performs class-based searching and filtration on the temporary D2D identity according to a type of a discovered device, a purpose and type of an initiated request and a type of a provided service, and employs a temporary D2D identity obtained by searching and filtration as the acquired temporary D2D identity.

In the described embodiment, the temporary D2D identity report at least includes one or more acquired D2D temporary identities and index(es) of the one or more D2D temporary identities of one or more the discovered devices.

Preferred Embodiment 9

Figure 21:
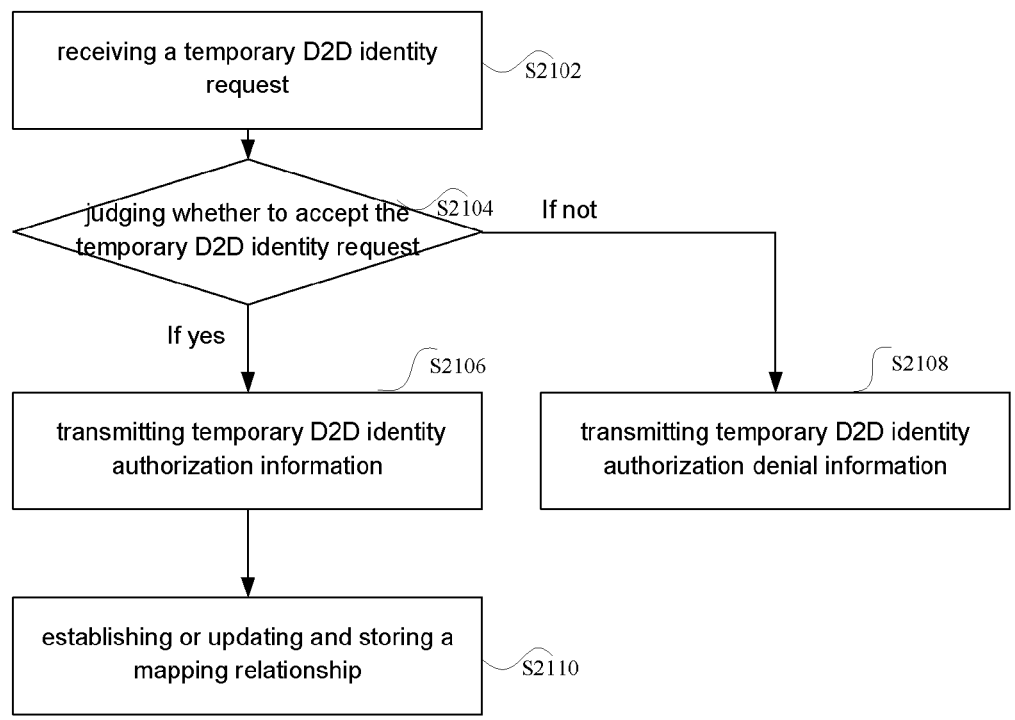
FIG. 21 is a first flowchart of an identity marking and identification method for a system side according to an embodiment of the disclosure.

The preferred embodiment provides an identity marking and identification method for D2D discovery, and describes steps executed by a D2D discovery system. FIG. 21 is a first flowchart of an identity marking and identification method for a system side according to an embodiment of the disclosure. As shown in FIG. 21, the method includes the following Step 2102 to Step 2110.

Step 2102: the system receives a temporary D2D identity request.

Step 2104: the system judges whether to accept the temporary D2D identity request, executes Step 2106 if a judgment result is positive, otherwise executes Step 2108.

Step 2106: the system transmits temporary D2D identity authorization information.

Step 2108: the system transmits temporary D2D identity authorization denial information.

Step 2110: a mapping relationship between a temporary D2D identity and a long-term D2D identity and/or a mapping relationship between the temporary D2D identity and a D2D application layer identity are/is established or updated and stored.

During implementation, whether to accept the temporary D2D identity request can be judged by virtue of multiple implementation modes. As a preferred implementation mode, whether to accept the temporary D2D identity request can be judged by evaluating a network strategy and a network condition and authenticating a discovered device transmitting the temporary D2D identity request. For example: if the network strategy and the network condition allow and the discovered device passes authentication, the system determines to accept the temporary D2D identity request; and if the network strategy and the network condition do not allow or the discovered device does not pass authentication, the system determines not to accept the temporary D2D identity request.

In the described embodiment, the network strategy at least includes a supporting strategy of a current network over a D2D discovery function, and further includes a supporting strategy of the current network over one or more of a type of the discovered D2D device, a purpose and type of the initiated request, a type of a provided service and the like.

In the described embodiment, the network condition at least includes a remaining condition of available D2D temporary identities, and further includes one or more of a load condition, a radio resource occupation condition, a core network resource occupation condition and the like of the current network.

As a preferred implementation mode, the step that the D2D discovery system authenticates the discovered device includes that the D2D discovery system acquires a long-term D2D identity and/or D2D application layer identity of the discovered device, and authenticates the long-term D2D identity and/or D2D application layer identity of the discovered device.

In the described embodiment, temporary D2D identity authorization information at least includes one or more D2D temporary identities or index(es) of the one or more D2D temporary identities.

In the described embodiment, the temporary D2D identity authorization denial information further includes one or more of information such as a denial reason and a backspace instruction.

Preferred Embodiment 10

Figure 22:
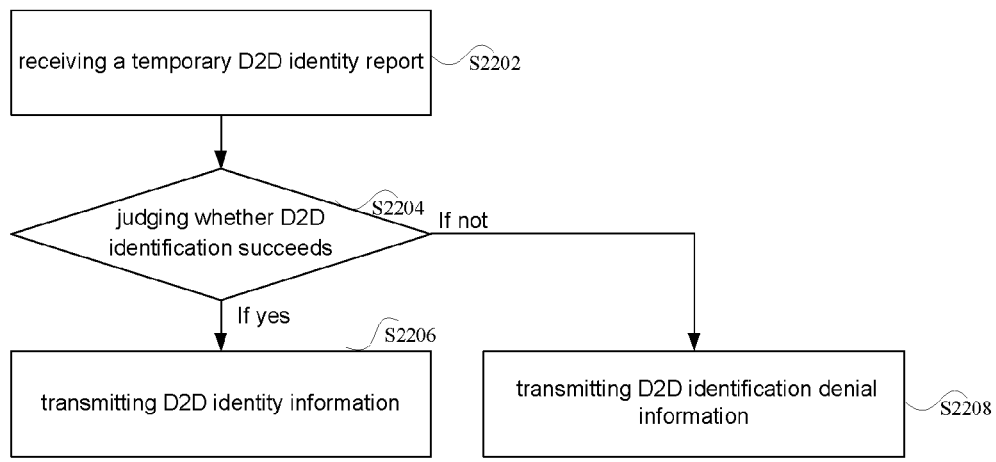
FIG. 22 is a second flowchart of an identity marking and identification method for a system side according to an embodiment of the disclosure.

The preferred embodiment provides an identity marking and identification method for D2D discovery, and describes steps executed by a D2D discovery system, FIG. 22 is a second flowchart of an identity marking and identification method for a system side according to an embodiment of the disclosure, and as shown in FIG. 22, the method includes the following Step 2202 to Step 2208.

Step 2202: the D2D discovery system receives a temporary D2D identity report.

Step 2204: the D2D discovery system judges whether D2D identification succeeds, executes Step 2206 if a judgment result is positive, otherwise executes Step 2208.

As a preferred implementation mode: the D2D discovery system can judge whether D2D identification succeeds according to the temporary D2D identity report, a temporary D2D identity, which is marked in the temporary D2D identity report, of a discovered device, a mapping relationship between the temporary D2D identity and a long-term D2D identity and/or a mapping relationship between the temporary D2D identity and a D2D application layer identity.

Step 2206: the system transmits D2D identity information.

Step 2208: the system transmits D2D identification failure information (D2D identification denial information).

During implementation, whether D2D identification succeeds can be judged by virtue of multiple modes. As a preferred implementation mode, the step that the D2D discovery system judges whether D2D identification succeeds according to the temporary D2D identity report includes that a network strategy and a network condition are evaluated, and a discovering device transmitting the temporary D2D identity report and the discovered device marked in the temporary D2D identity report are authenticated;

if the network strategy and the network condition allow and the discovering device and the discovered device pass authentication, the system determines that D2D identification succeeds; and if the network strategy and the network condition do not allow or the discovering device and the discovered device do not pass authentication, the system determines that D2D identification does not succeed.

In the described embodiment, the network strategy at least includes a supporting strategy of a current network over a D2D discovery function, and further includes a supporting strategy of the current network over one or more of a type of the discovered D2D device, a purpose and type of an initiated request, a type of a provided service and the like.

In the described embodiment, the network condition at least includes a maintenance condition of the mapping relationship between the temporary D2D identity and long-term D2D identity of the discovered device and/or the mapping relationship between the temporary D2D identity and the D2D application layer identity, and further includes one or more of a load condition, a radio resource occupation condition, a core network resource occupation condition and the like of the current network.

During implementation, the discovering device can be authenticated by virtue of multiple implementation modes, and preferably, the step that the D2D discovery system authenticates the discovering device includes that a long-term D2D identity and/or D2D application layer identity of the discovering device are/is acquired, and the long-term D2D identity and/or D2D application layer identity of the discovering device are/is authenticated.

As a preferred implementation mode, the step that the D2D discovery system authenticates the discovering device and the discovered device can include that the long-term D2D identity and/or D2D application layer identity of the discovering device and a filtering list and/or filtering criterion, for the long-term D2D identity and/or the D2D application layer identity, of the discovering device are acquired, the long-term D2D identity and/or D2D application layer identity of the discovered device and a filtering list and/or filtering criterion, for the long-term D2D identity and/or the D2D application layer identity, of the discovered device are acquired, and the discovering device and the discovered device are authenticated according to the D2D long-term identities and/or the D2D application layer identities and the filtering lists and/or the filtering criteria, for the D2D long-term identities and/or the D2D application layer identities, of the discovering device and the discovered device.

As another preferred implementation mode, the step that the D2D discovery system acquires the long-term D2D identity and/or the D2D application layer identity of the discovered device can include that the D2D discovery system acquires the temporary D2D identity of the discovered device, acquires the long-term D2D identity of the discovered device according to the stored mapping relationship between the temporary D2D identity and the long-term D2D identity, and/or acquires the D2D application layer identity of the discovered device according to the stored mapping relationship between the temporary D2D identity and the D2D application layer identity.

In the described embodiment, the filtering list and/or filtering criterion, for the long-term D2D identity and/or the D2D application layer identity, the discovering device include(s) the long-term D2D identity and/or the D2D application layer identity of the discovered device which is allowed or not allowed to be discovered by the discovering device, and a long-term D2D identity set and/or D2D application layer identity set of a group of the discovered device which is allowed or not allowed to be discovered by the discovering device and has the same characteristic.

In the described embodiment, the filtering list and/or filtering criterion, for the long-term D2D identity and/or the D2D application layer identity, of the discovered device include(s) the long-term D2D identity and/or D2D application layer identity of the discovering device which is allowed or not allowed to be discovered by the discovered device, and a long-term D2D identity set and/or D2D application layer identity set of a group of the discovering device which is allowed or not allowed to be discovered by the discovered device and has the same characteristic.

As another preferred implementation mode, the temporary D2D identity report at least includes one or more D2D temporary identities of one or more the discovered devices or index(es) of the one or more D2D temporary identities.

As another preferred implementation mode, the D2D identity information at least includes the authenticated long-term D2D identity, marked in the temporary D2D identity report, of the discovered device, and/or the authenticated D2D application layer identity carried in the D2D identity information.

In the described embodiment, the D2D identification failure information includes information such as a failure reason.

Preferred Embodiment 11

Figure 25:
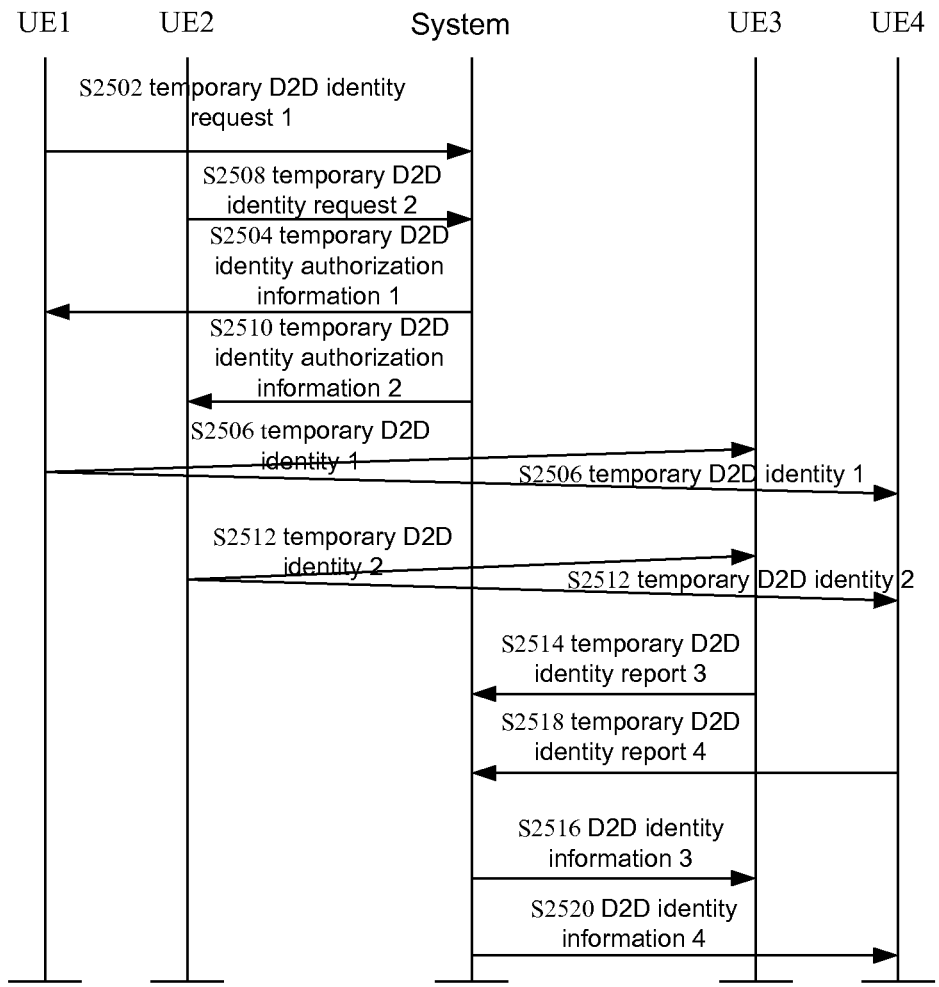
FIG. 25 is a flowchart of a D2D identity processing method according to a preferred embodiment of the disclosure.

The preferred embodiment provides a D2D identity processing method. In the preferred embodiment, User Device (UE) 1, UE2, UE3 and UE4 are adjacent D2D devices, UE1 and UE2 are discovered device, that is, UE1 and UE2 are expected to be discovered by the other D2D device in the vicinity, and UE3 and UE4 are the discovering devices respectively, that is, UE3 and UE4 are expected to discover the other D2D device(s) in the vicinity. Users with UE1, UE2, UE3 and UE4 are user 1, user 2, user 3 and user 4 respectively. FIG. 25 is a flowchart of a D2D identity processing method according to a preferred embodiment of the disclosure, and as shown in FIG. 25, the method includes the following S2502 to Step 2520.

Step 2502: UE1 transmits a D2D identity request 1 to eNB1 and MME1, the D2D identity request 1 carrying a long-term D2D identity, a D2D device dedicated identity 1 and a D2D application layer identity: an application account 1, and declares that UE1 is a private device, a purpose of request initiation is social contact and a type of a provided service is chat dating.

Step 2504: MME1 receives the temporary D2D identity request 1 from UE1, and authenticates the D2D device dedicated identity 1 of UE1. If the D2D device dedicated identity 1 of UE1 passes authentication, MME1 authenticates the application account 1 of UE1. If the application account of UE1 passes authentication and eNB1 evaluates that there are available D2D temporary identities remaining in a network, eNB1 allocates a temporary D2D identity 1 in form of 6-bit binary character string to UE1 according to a type of UE1, the purpose of the initiated request and the type of the provided service, carries an index of the temporary D2D identity 1 into temporary D2D identity authorization information 1, and transmits the temporary D2D identity authorization information 1 to UE1. A D2D network side dedicated management entity 1 establishes, updates and stores a mapping relationship between the temporary D2D identity and D2D device dedicated identity 1 of UE1, and meanwhile, a D2D application layer dedicated management entity 1 updates the mapping relationship between the temporary D2D identity 1 and application account 1 of UE1.

Step 2506: UE1 receives the temporary D2D identity authorization information 1 from eNB1, acquires the temporary D2D identity 1, and performs broadcasting.

In the above process, if the authentication of MME1 fails or eNB1 evaluates that there is no available temporary D2D identity in the network at this moment in any step, the step is stopped, and MME1 or eNB1 transmits temporary D2D identity authorization denial information 1 to UE1 to notify UE1 that UE1 has no right to or cannot acquire the temporary D2D identity authorization information. UE1 receives the temporary D2D identity authorization denial information 1, and the identity marking and identification process during the D2D discovery is ended.

Step 2508: UE2 transmits a temporary D2D identity request 2 to eNB1 and MME2, and declares that UE2 is a commercial device and types of provided services are advertisement presentation and merchant interaction.

Step 2510: MME2 receives the temporary D2D identity request 2 from UE2, acquires a D2D device dedicated identity 2 of UE2 from information recorded in the system, and performs authentication. If the authentication succeeds, MME2 authenticates the type of UE2 and the types of the provided services, if the advertisement presentation and merchant interaction service of the commercial device can be allowed within this time period and this area, that is, the type of UE2 and the types of the provided services pass authentication, and when eNB1 evaluates that there are available D2D temporary identities remaining in the network, eNB1 allocates a temporary D2D identity 2 in form of 6-bit binary character string to UE2 according to the type of UE2 and the types of the provided services, carries an index of the temporary D2D identity 2 into temporary D2D identity authorization information 2, and transmits the temporary D2D identity authorization information 2 to UE2. The D2D network side dedicated management entity 1 updates and stores a mapping relationship between the temporary D2D identity 2 and D2D device dedicated identity 2 of UE2.

Step 2512: UE2 receives the temporary D2D identity authorization information 2 from eNB1, acquires the temporary D2D identity 2, and performs broadcasting.

In the above process, if the authentication of MME2 fails or eNB1 evaluates that there is no available temporary D2D identity in the network at this moment in any step, the step is stopped, and MME2 or eNB1 transmits temporary D2D identity authorization denial information 2 to UE2 to notify UE2 that UE2 has no right to or cannot acquire the temporary D2D identity authorization information as well as a denial reason. UE2 receives the temporary D2D identity authorization denial information 2, and the identity marking and identification process during the D2D discovery is ended.

Step 2514: UE3 finds the temporary D2D identity 1 and the temporary D2D identity 2, and filters the found D2D temporary identities according to its interest: social contact, wherein the temporary D2D identity 2 of UE2 which provides a service of a non-social contact type is filtered, and the temporary D2D identity 1 is kept. Or, UE3 directly performs searching according to its interest, and only finds the temporary D2D identity 1.

UE3 carries an index of the temporary D2D identity 1 and an application layer identity: an application account 3, of UE3 into a temporary D2D identity report 3, and transmits the temporary D2D identity report 3 to MME3.

Figure 24:
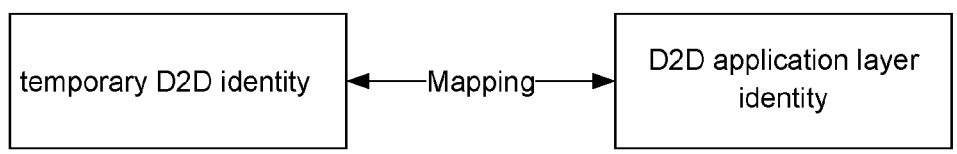
FIG. 24 is a diagram of mutual mapping between a temporary D2D identity and a D2D application layer identity according to an embodiment of the disclosure.

Step 2516: MME3 receives the temporary D2D identity report 3 from UE3, acquires the index of the temporary D2D identity 1 and the application account 3, acquires a D2D device dedicated identity 3 of UE3 according to the recorded information of UE3 in the system, authenticates the D2D device dedicated identity 3, and authenticates the application account 3 if the D2D device dedicated identity 3 passes authentication, the D2D network side dedicated management entity 1 acquires a long-term D2D identity: the D2D device dedicated identity 1, of UE1 according to a mapping relationship between the index of the temporary D2D identity 1 and the long-term D2D identity if the application account 3 also passes authentication, and filters the D2D device dedicated identity 1 and the D2D device dedicated identity 3 according to filtering lists of the discovering device and the discovered device, and for filtered UE1, the D2D application layer dedicated management entity 1 acquires the D2D application layer identity, i.e. the application account 1, of UE1 according to the mapping relationship (as shown in FIG. 24) between the temporary D2D identity 1 and the D2D application layer identity, and filters the application account 1 and the application account 3 according to the filtering lists of the discovering device and the discovered device, and for filtered UE1, MME3 carries the application account 1 in D2D identity information 3, and transmits the D2D identity information 3 to UE3.

UE3 receives the D2D identity information 3 from MME3, and acquires the application account 1, and at this moment, UE3 has finished identifying the adjacent device UE1.

In the above process, if the authentication of MME3 fails in any step, the step is stopped, and MME3 transmits D2D temporary identification failure information 3 to UE3 to notify UE3 that UE3 cannot or has no right to identify the identity information of the corresponding the D2D device as well as a failure reason. UE3 receives the D2D temporary identification failure information 3, and the identity marking and identification process during the D2D discovery is ended.

Step 2518: UE4 finds the temporary D2D identity 1 and the temporary D2D identity 2, carries the obtained temporary D2D identity 1 and temporary D2D identity 2 and a long-term identity: a D2D device dedicated identity 4, of UE4 into a temporary D2D identity report 4, and transmits the temporary D2D identity report 4 to MME4.

Figure 23:
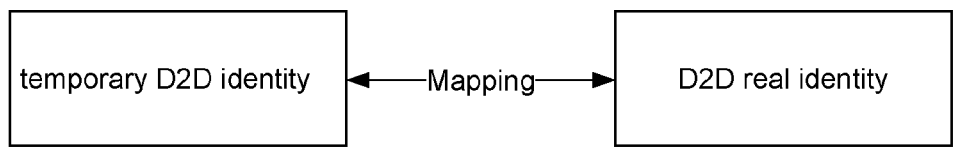
FIG. 23 is a diagram of mutual mapping between a temporary D2D identity and a long-term D2D identity according to an embodiment of the disclosure.

Step 2520: MME4 receives the temporary D2D identity report 4 from UE4, acquires the temporary D2D identity 1, the temporary D2D identity and the D2D device dedicated identity 4 of UE4, and authenticates the D2D device dedicated identity 4. If the D2D device dedicated identity 4 passes authentication:

the D2D network side dedicated management entity 1 acquires the D2D device dedicated identity 1 of UE1 according to the mapping relationship (as shown in FIG. 23) between the temporary D2D identity 1 and the long-term D2D identity, acquires the stored filtering lists, for the long-term D2D identity, of UE1 and UE4, and filters the D2D device dedicated identity 1 and the D2D device dedicated identity 4 according to the filtering lists of the two parties, and for filtered UE1, the D2D application layer dedicated management entity 1 acquires the D2D application layer identity, i.e. the application account 1, of UE1 according to the mapping relationship between the temporary D2D identity 1 and the D2D application layer identity, acquires the application account 4 corresponding to the D2D device dedicated identity 4 of UE4 according to the mapping relationship between the long-term D2D identity and the D2D application layer identity, and filters the application account 1 and the application account 4 according to the filtering lists, for the D2D application layer identity, of UE1 and UE4 if the application account 4 exists, and if the re-filtered UE1 still meets a condition for the discovery and identification of UE4 over UE1, MME4 carries the application account 1 into D2D identity information 4, and transmits the D2D identity information 4 to UE4; and meanwhile, the D2D network side dedicated management entity 1 acquires the long-term D2D identity: the D2D device dedicated identity 2, of UE2 and the corresponding filtering lists for the long-term D2D identity in the same manner, and filters the D2D device dedicated identity 2 and the D2D device dedicated identity 4, and if UE2 still meets a condition after filtration, MME4 carries the D2D device dedicated identity 2 into the D2D identity information 4, and transmits the D2D identity information 4 to UE4.

UE4 receives the D2D identity information 4 from MME4, and acquires the application account 1 and the D2D device dedicated identity 2, and at this moment, UE4 has finished identifying the adjacent device UE1 and UE2.

In the above process, if the application account does not exist, the step is stopped, and D2D identification failure information 4 is transmitted to UE4 to notify that UE4 cannot identify the identity information of UE1. UE4 receives the D2D identification failure information 4, and the identity marking and identification process during the D2D discovery is ended.

Moreover, in the above process, if the authentication of MME4 fails in any step, the step is stopped, and MME4 transmits the D2D temporary identification failure information 4 to UE4 to notify UE4 that UE4 cannot or has no right to identify the identity information of the corresponding D2D device. UE4 receives the D2D temporary identification failure information 4 for UE1 and/or UE2, and the identity marking and identification process during the D2D discovery is ended.

Moreover, in the above process, if filtered UE1 or UE2 does not meet the condition for the discovery and identification of UE4 over UE1 or UE2 when the D2D network side dedicated management entity 1 filters UE1, UE2 and UE4 according to the filtering lists for the D2D long-term identities or the D2D application identities in any step, the step is stopped, MME4 transmits the D2D identification failure information 4 to UE4 to notify UE4 that UE4 has no right to identify the identity information of the corresponding the D2D device as well as a specific reason. UE4 receives the D2D identification failure information 4 for UE1 and/or UE2, and the identity marking and identification process during the D2D discovery is ended.

By the embodiment, the identity processing methods and devices for the D2D device are provided, and the D2D discovery system is adopted to control and authenticate communication among the D2D devices, so that the security risk of direct communication among the devices is lowered, meanwhile, time-frequency resources occupied by signalling transmission a the D2D devices are reduced, the problem of higher security risk of the communication process in the identity processing process of the D2D device in the related art is solved, and an effect of improving the identity processing security of the D2D device is further achieved. It should be noted that these technical effects are not achieved by all the above-mentioned implementation modes, and some technical effects can be achieved by certain preferred implementation modes.

Obviously, those skilled in the art should know that each component or step of the disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or can form each integrated circuit component, or multiple components or steps therein can form a single integrated circuit component for implementation. As a consequence, the disclosure is not limited to any specific hardware and software combination.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed is:

1. A method for processing Device-to-Device (D2D) device identity, comprising:
   transmitting, by a D2D device, a temporary D2D identity request;
   receiving, by the D2D device, temporary D2D identity authorization information corresponding to the temporary D2D identity request, and acquiring a temporary D2D identity; and
   broadcasting, by the D2D device, the acquired temporary D2D identity, wherein the temporary D2D identity is used for discovering the D2D device by a discovering D2D device in a D2D discovery process;
   wherein when the D2D device transmits the temporary D2D identity request, the D2D device reports at least one piece of the following information: a type of the D2D device, a purpose and type of the temporary D2D identity request transmitted by the D2D device and a type of a service provided by the D2D device.

2. The method according to claim 1, wherein after transmitting, by the D2D device, the temporary D2D identity request, the method further comprises:
   receiving, by the D2D device, temporary D2D identity authorization denial information corresponding to the temporary D2D identity request; and
   ending, by the D2D device, an identity marking and identification process in the D2D discovery process.

3. The method according to claim 1, wherein
   the temporary D2D identity is used for identifying, within a preset time and a preset area coverage, a temporary identity of the D2D device and/or a temporary identity of a user corresponding to the D2D device.

4. A method for processing Device-to-Device (D2D) device identity, comprising:
   performing, by a D2D device, preset-class-based filtration according to at least one piece of the following information of one or more discovered D2D devices: a type of the discovered D2D device, a purpose and type of a temporary D2D identity request transmitted by the discovered D2D device and a type of a service provided by the discovered D2D device;
   employing, by the D2D device, one or more D2D temporary identities obtained by filtration as the acquired one or more temporary identities;
   transmitting, by the D2D device, a temporary D2D identity report, wherein the one or more temporary identities or one or more indexes of the one or more D2D temporary identities are carried in the temporary D2D identity report; and
   receiving, by the D2D device, D2D identification success information corresponding to the temporary identity report, and acquiring a long-term D2D identity and/or D2D application layer identity carried in the D2D identification success information.

5. The method according to claim 4, wherein after transmitting, by the D2D device, the temporary D2D identity report, the method further comprises:
   receiving, by the D2D device, D2D identification failure information corresponding to the temporary identity report; and
   ending, by the D2D device, an identity marking and identification process in a D2D discovery process.

6. The method according to claim 4, wherein
   the temporary D2D identity is used for identifying, within a preset time and a preset area coverage, a temporary identity of the D2D device and/or a temporary identity of a user corresponding to the D2D device;
   the long-term D2D identity is used for carrying long-term identity information of the D2D device and/or the user corresponding to the D2D device; and
   the D2D application layer identity is used for identifying the application layer identity information of the D2D device and/or the user corresponding to the D2D device in different applications, wherein the D2D device has one or more D2D application layer identities.

7. The method according to claim 6, wherein the long-term D2D identity comprises one or a combination of:
   a Temporary Mobile Subscriber Identity (TMSI), a Globally Unique Temporary UE Identity (GUTI), an International Mobile Subscriber Identity (IMSI), an International Mobile Equipment Identity (IMEI), an Internet Protocol (IP) address and D2D device dedicated identity information.

8. A method for processing Device-to-Device (D2D) device identity, comprising:
   receiving, by a D2D discovery system, a temporary D2D identity request;
   determining, by the D2D discovery system, whether to accept the temporary D2D identity request according to a preset strategy; and
   when the D2D discovery system determines to accept the temporary D2D identity request, transmitting, by the D2D discovery system, temporary identity authorization information corresponding to the temporary D2D identity request, establishing or updating a first mapping relationship between a temporary D2D identity and a long-term D2D identity of a D2D device, and/or establishing or updating a second mapping relationship between the temporary D2D identity and a D2D application layer identity of the D2D device.

9. The method according to claim 8, wherein determining, by the D2D discovery system, whether to accept the temporary D2D identity request according to the preset strategy comprises:
   determining, by the D2D discovery system, whether the temporary D2D identity request is allowed to be accepted according to a preset network strategy and a current network condition;
   performing, by the D2D discovery system, legality authentication on the D2D device; and
   determining, by the D2D discovery system, to accept the temporary D2D identity request when the temporary D2D identity request is allowed to be accepted and the D2D device is authenticated to be legal, otherwise determining, by the D2D discovery system, not to accept the temporary D2D identity request;
   wherein the preset network strategy comprises:
   a supporting strategy of a current network over a D2D discovery function; or
   the supporting strategy of the current network over the D2D discovery function and at least one of: a type of the discovered D2D device, a purpose and type of the temporary D2D identity request transmitted by the discovered D2D device and a type of a service provided by the discovered D2D device; and
   the current network condition comprises at least one of:

a load condition, a radio resource occupation condition and a core network resource occupation condition.

10. The method according to claim 8, wherein
the D2D discovery system comprises: a network side management entity; or
the network side management entity and an application layer management entity;
wherein the network side management entity comprises at least one of: an evolved Node B (eNB), a Mobile Management Entity (MME), a Home Subscriber Server (HSS) and a D2D network side dedicated management entity; and the application layer management entity comprises at least one of: an Application Server (AS) and a D2D application layer dedicated server.

11. A method for processing Device-to-Device (D2D) device identity, comprising:
receiving, by a D2D discovery system, a temporary D2D identity report, wherein one or more temporary D2D identities or one or more indexes of the one or more D2D temporary identities are carried in the temporary D2D identity report;
determining, by the D2D discovery system, whether identity information of a second D2D device marked by the temporary D2D identity is successfully identified according to at least one of:
the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device; and
when the identity information of second D2D device marked by the temporary D2D identity is successfully identified, transmitting, by the D2D discovery system, D2D identification success information corresponding to the temporary D2D identity report.

12. An apparatus for processing Device-to-Device (D2D) device identity, which is applied to a D2D device and comprises:
a first transmission component, configured to transmit a temporary D2D identity request;
a first receiving component, configured to receive temporary D2D identity authorization information corresponding to the temporary D2D identity request;
a first acquisition component, configured to acquire a temporary D2D identity; and
a broadcasting component, configured to broadcast the acquired temporary D2D identity, wherein the temporary D2D identity is configured to discover the D2D device by a discovering D2D device in a D2D discovery process;
Wherein when the D2D device transmits the temporary D2D identity request, the D2D device reports at least one piece of the following information: a type of the D2D device, a purpose and type of the temporary D2D identity request transmitted by the D2D device and a type of a service provided by the D2D device.

13. The device according to claim 12, further comprising:
a second receiving component, configured to receive temporary D2D identity authorization denial information corresponding to the temporary D2D identity request; and
a first processing component, configured to end an identity marking and identification process in the D2D discovery process.

14. An apparatus for processing Device-to-Device (D2D) device identity, which is applied to a D2D device and comprises:
a second acquisition component, configured to acquire one or more temporary identities;
a second transmission component, configured to transmit a temporary D2D identity report, wherein the one or more temporary identities or one or more indexes of the one or more D2D temporary identities are carried in the temporary D2D identity report;
a third receiving component, configured to receive D2D identification success information corresponding to the temporary identity report; and
a third acquisition component, configured to acquire a long-term D2D identity and/or D2D application layer identity carried in the D2D identification success information;
wherein the second acquisition component comprises:
a filtering component, configured to perform preset-class-based filtration according to at least one piece of the following information of one or more discovered D2D devices: a type of the discovered D2D device, a purpose and type of a temporary D2D identity request transmitted by the discovered D2D device and a type of a service provided by the discovered D2D device;
a third processing component, configured to employ one or more D2D temporary identities obtained by filtration as the acquired one or more temporary identities.

15. The device according to claim 14, further comprising:
a fourth receiving component, configured to receive D2D identification failure information corresponding to the temporary identity report; and
a second processing component, configured to end an identity marking and identification process in a D2D discovery process.

16. An apparatus for processing Device-to-Device (D2D) device identity, which is applied to a D2D discovery system and comprises:
a fifth receiving component, configured to receive a temporary D2D identity request;
a first judgment component, configured to determine whether to accept the temporary D2D identity request according to a preset strategy;
a third processing component, configured to, when the first judgement component accepts the temporary D2D identity request, transmit temporary identity authorization information corresponding to the temporary D2D identity request; and
an establishment and updating component, configured to establish or update a first mapping relationship between a temporary D2D identity and a long-term D2D identity of the D2D device marked by the temporary D2D identity, and/or establish or update a second mapping relationship between the temporary D2D identity and a D2D application layer identity of the D2D device marked by the temporary D2D identity.

17. An apparatus for processing Device-to-Device (D2D) device identity, which is applied to a D2D discovery system and comprises:
a sixth receiving component, configured to receive a temporary D2D identity report, wherein one or more D2D temporary identities or one or more indexes of the one or more D2D temporary identities are carried in the temporary D2D identity report;
a second judgement component, configured to detect whether D2D identification over a second D2D device marked by the temporary D2D identity succeeds according to at least one of:

the temporary D2D identity report, the temporary D2D identity of the second D2D device, a first mapping relationship between the temporary D2D identity of the second D2D device and a long-term D2D identity corresponding to the second D2D device and a second mapping relationship between the temporary D2D identity of the second D2D device and a D2D application layer identity of the second D2D device; and a third transmission component, configured to, when the identity information of the second D2D device marked by the temporary D2D identity is successfully identified, transmit D2D identification success information corresponding to the temporary D2D identity report.

18. The device according to claim 17, wherein the second judgement component comprises:

a second determination component, configured to detect whether to allow identification over the second D2D device according to a preset network strategy and a current network condition;

a third authentication component, configured to perform legality authentication on a first D2D device transmitting the temporary D2D identity report and the second D2D device;

a seventh processing component, configured to, when the identification over the second D2D device is allowed and authentication results of the third authentication component over the first D2D device and the second D2D device are positive, determine that the identification over the second D2D device succeeds; and an eighth processing component, configured to, when the identification over the second D2D device is not allowed and the authentication results of the third authentication component over the first D2D device and the second D2D device are negative, determine that the identification over the second D2D device fails.

* * * * *